US009132754B2

(12) United States Patent
Mindel et al.

(10) Patent No.: US 9,132,754 B2
(45) Date of Patent: Sep. 15, 2015

(54) SAFETY SEAT

(71) Applicant: MOBIUS PROTECTION SYSTEMS LTD., Holon (IL)

(72) Inventors: Shy Mindel, Kibutz Bahan (IL); Anan Hassan, Julis (IL); David Engel, Yavne (IL)

(73) Assignee: MOBIUS PROTECTION SYSTEMS LTD., Holon (IL)

( * ) Notice: Subject to any disclaimer, the term of this patent is extended or adjusted under 35 U.S.C. 154(b) by 0 days.

(21) Appl. No.: 14/347,877

(22) PCT Filed: Sep. 27, 2012

(86) PCT No.: PCT/IL2012/000351
§ 371 (c)(1),
(2) Date: Mar. 27, 2014

(87) PCT Pub. No.: WO2013/046200
PCT Pub. Date: Apr. 4, 2013

(65) Prior Publication Data
US 2014/0239684 A1     Aug. 28, 2014

Related U.S. Application Data

(60) Provisional application No. 61/539,520, filed on Sep. 27, 2011.

(51) Int. Cl.
*B60N 2/26*     (2006.01)
*B60N 2/427*     (2006.01)
(Continued)

(52) U.S. Cl.
CPC ............ *B60N 2/42736* (2013.01); *B60N 2/286* (2013.01); *B60N 2/289* (2013.01);
(Continued)

(58) Field of Classification Search
USPC ............ 297/472, 314, 216.2, 216.19, 216.16, 297/216.11, 253, 256.16
See application file for complete search history.

(56) References Cited

U.S. PATENT DOCUMENTS 2,227,717 A * 1/1941 Jones .................... 297/302.4
2,317,894 A * 4/1943 Doty .......................... 297/253
(Continued)

FOREIGN PATENT DOCUMENTS

DE     10130632     1/2003
EP     2163425     3/2010
(Continued)

OTHER PUBLICATIONS

Written Opinion dated Feb. 8, 2013 for International Application No. PCT/IL2012/000351.
(Continued)

*Primary Examiner* — David E Allred
(74) *Attorney, Agent, or Firm* — Pearl Cohen Zedek Latzer Baratz LLP

(57) ABSTRACT

An energy absorbing device for carrying a passenger seat; the device comprises a base fixed to a vehicle; a member displaceable from base; at least one energy-absorbing arrangement interconnecting base and displaceable member. The energy-absorbing arrangement comprises a plastically deformable absorbing element in response to stresses greater than a predetermined threshold stress. In some embodiments the plastically deformable absorbing element is a helically configured ribbon having spaced-apart ribbon laps. In other embodiments the plastically deformable absorbing element is compressible, and/or extendable. A method of attenuating the acceleration applied to a passenger due to impact is disclosed; the method comprises steps of: providing an energy absorbing device fixedly attaching the base to the vehicle; fixedly attaching the passenger seat to the base; accidently applying the impact to the vehicle; displacing the displaceable member relative to the base; attenuating the effect of the impact on the passenger.

10 Claims, 41 Drawing Sheets

(51) Int. Cl.
    *B60N 2/28* (2006.01)
    *B60N 2/42* (2006.01)

(52) U.S. Cl.
    CPC .......... *B60N 2/2821* (2013.01); *B60N 2/2824* (2013.01); *B60N 2/2869* (2013.01); *B60N 2/2872* (2013.01); *B60N 2/2884* (2013.01); *B60N 2/4214* (2013.01); *B60N 2/42709* (2013.01); *B60N 2/2863* (2013.01); *B60N 2/4235* (2013.01)

(56) References Cited

U.S. PATENT DOCUMENTS

| | | | | |
|---|---|---|---|---|
| 2,682,931 | A * | 7/1954 | Young | 188/374 |
| 3,145,051 | A * | 8/1964 | Rausch | 297/216.2 |
| 3,734,562 | A * | 5/1973 | Fourrey | 297/216.19 |
| 3,802,737 | A * | 4/1974 | Mertens | 297/216.2 |
| 4,150,805 | A | 4/1979 | Mazelsky | |
| 4,257,626 | A * | 3/1981 | Adomeit | 280/806 |
| 4,349,167 | A * | 9/1982 | Reilly | 244/122 R |
| 5,152,578 | A * | 10/1992 | Kiguchi | 297/216.16 |
| 5,324,095 | A * | 6/1994 | Yamauchi | 297/344.14 |
| 5,344,210 | A * | 9/1994 | Marwan et al. | 297/216.2 |
| 5,639,144 | A * | 6/1997 | Naujokas | 297/238 |
| 5,657,950 | A * | 8/1997 | Han et al. | 244/122 R |
| 5,685,603 | A | 11/1997 | Lane, Jr. | |
| 6,053,573 | A * | 4/2000 | Nakagawa | 297/250.1 |
| 6,109,691 | A | 8/2000 | Gray et al. | |
| 6,244,656 | B1 * | 6/2001 | Mueller | 297/216.13 |
| 6,406,092 | B1 * | 6/2002 | Cordes et al. | 297/216.16 |
| 6,550,740 | B1 | 4/2003 | Burer | |
| 6,648,409 | B1 * | 11/2003 | Laporte | 297/216.1 |
| 6,752,455 | B2 * | 6/2004 | Teufel et al. | 297/216.1 |
| 7,219,958 | B2 * | 5/2007 | Yamazaki et al. | 297/256.13 |
| 7,413,158 | B1 | 8/2008 | Burer | |
| 7,510,240 | B2 * | 3/2009 | Jones et al. | 297/216.19 |
| 7,533,934 | B2 * | 5/2009 | Foelster et al. | 297/253 |
| 7,748,766 | B2 | 7/2010 | Villeminey | |
| 8,157,067 | B2 * | 4/2012 | Ruthinowski et al. | 188/372 |
| 8,608,142 | B2 | 12/2013 | Von et al. | |
| 8,641,140 | B2 * | 2/2014 | Swierczewski | 297/216.15 |
| 8,882,195 | B2 * | 11/2014 | Kaessner et al. | 297/216.2 |
| 2003/0209926 | A1 | 11/2003 | Nakagawa et al. | |
| 2007/0284922 | A1 * | 12/2007 | Matsuhashi | 297/216.2 |
| 2009/0160228 | A1 * | 6/2009 | Houston et al. | 297/216.2 |
| 2010/0102170 | A1 * | 4/2010 | LaConte | 244/122 R |
| 2011/0233975 | A1 | 9/2011 | Mindel et al. | |
| 2012/0061195 | A1 | 3/2012 | Von et al. | |
| 2012/0267927 | A1 * | 10/2012 | Rattenbury et al. | 297/256.16 |

FOREIGN PATENT DOCUMENTS

| | | |
|---|---|---|
| WO | 2008032047 A1 | 3/2008 |
| WO | WO 2009/102241 | 8/2009 |
| WO | 2010041235 A1 | 4/2010 |
| WO | WO 2010/041235 | 4/2010 |
| WO | 2010127812 A1 | 11/2010 |

OTHER PUBLICATIONS

International Search Report dated Apr. 4, 2013 for International Application No. PCT/IL2012/000351.
International Preliminary Report on Patentability dated Feb. 25, 2014 for International Application No. PCT/IL2012/000351.
Supplementary European Search Report of Application No. EP 12836035 dated Apr. 7, 2015.

* cited by examiner

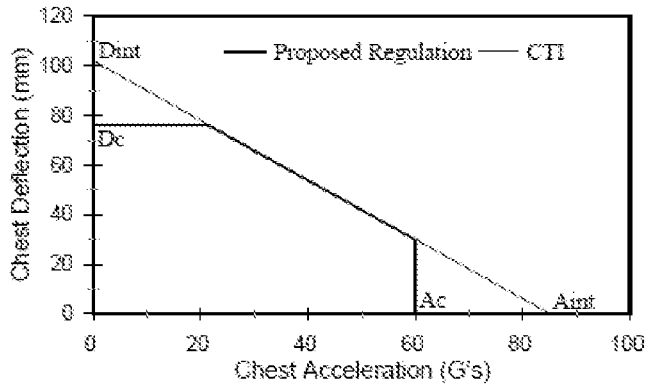

Fig. 1a

| Recommended Criteria | Hybrid III Mid-Sized Male | Hybrid III Small Female | Hybrid III 6 Years | Hybrid III 3 Years | CRABI 12 Months |
|---|---|---|---|---|---|
| Head Criteria HIC (36 msec) | 1000 | 1000 | 1000 | 900 | 660 |
| Neck Criteria Nij | 1.4 | 1.4 | 1.4 | 1.4 | 1.4 |
| Critical Intercept Values: Tens./Comp. (N) Flexion (Nm) Extension (Nm) | 3600 410 125 | 3200 210 60 | 2900 125 40 | 2500 100 30 | 2200 85 25 |
| Thoracic Criteria 1. Critical Spine Acceleration (g) | 60 | 60 | 60 | 50 | 40 |
| 2. Critical Chest Deflection (mm) | 76 (3.0 in) | 62 (2.5 in) | 47 (1.9 in) | 42 (1.7 in) | 33** (1.3 in) |
| 3. Combined Thoracic Index (CTI) | 1.0 | 1.0 | 1.0 | 1.0 | 1.0** |
| CTI Intercept Values Accel. (g's) Deflection (mm)* | 85 102 (4.0 in) | 85 83 (3.3 in) | 85 63 (2.5 in) | 70 57 (2.2 in) | 55 49 (2.0 in) |
| Lower Ext. Criteria Femur Load (kN) | 10.0 | 6.8 | NA | NA | NA |

Fig. 1b

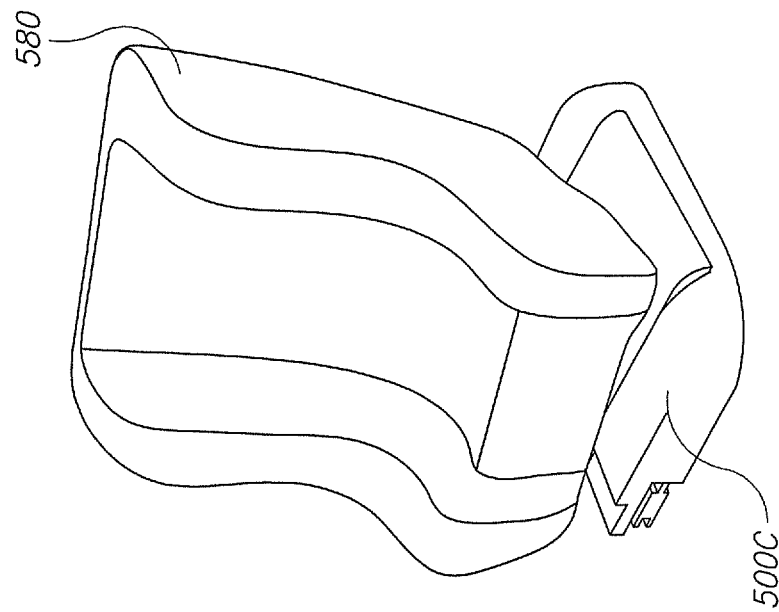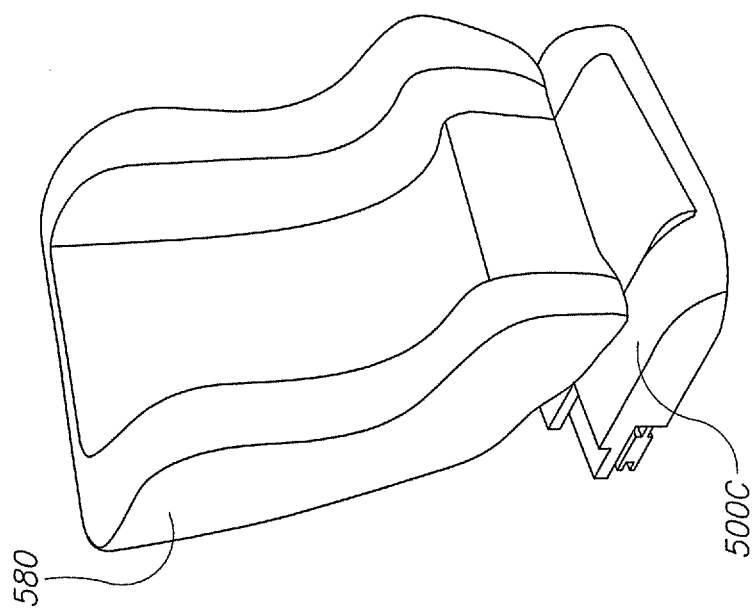
Figure 9

SAFETY SEAT

FIELD OF THE INVENTION

The present invention relates to a passenger safety seat for use in vehicles or other mobile applications, designed to limit horizontal occupant accelerations.

BACKGROUND OF THE INVENTION

In vehicle collisions a chief cause of injury is the extreme impulses experienced; the human body has a limited ability to cope with accelerations experienced over given durations of time. For example, the US Federal Motor Vehicle Safety Standards specify maximum allowable measures listed in FIGS. 1a and 1b.

To lower the maximum impulse experienced, the distance through which the body travels when changing its initial to final velocity must be increased, or equivalently, the time during which the acceleration is experienced must be increased. For example, in a head-on collision of a vehicle with a rigid wall, the occupant's body will undergo a change from the vehicle's initial speed to zero speed within a certain distance. The acceleration undergone is determined by the initial velocity and this distance. If this distance can be increased, the acceleration will be decreased. Care must be taken that the passengers will experience the maximum possible acceptable impulse or less, which can be accomplished by use of energy-absorbing elements of suitable design, devices to increase the travel available to the occupant, or both. The ideal energy absorber connecting a passenger to the rest of a vehicle transmits the maximum acceptable stress to the occupant or less, reaching this level after a minimum of travel. It would transmit this level of stress and no more, no matter the level of stress imparted to it.

Solutions known from the prior art provide shock absorbing seats based on different types of elastic or plastic deformation or breakage of metallic components, collapsible bar mounts or columns made of metals and/or composite materials, crushable honeycomb, etc. Some available solutions present a full system including both an original seat and a built-in integrated absorbing mechanism.

U.S. Pat. No. 5,685,603 discloses an apparatus for a vehicle includes a child seat for holding a child. A support device supports the child seat on a seat of the vehicle for movement relative to the seat during a collision in which at least one condition exceeds a predetermined threshold. An energy absorbing device absorbs kinetic energy of the child and the child seat during such relative movement. The support device may include support bars that permit sliding movement of the child seat relative to the support bars and the vehicle seat. Several types of energy absorbing devices may be used, including compressible bellows, cut able strips of sacrificial material, crushable pieces of sacrificial material, deformable projections, a payout device with webbing, compressible shock absorber assemblies, and slid able frictionally engaging portions.

U.S. Pat. No. 5,152,578 a front leg is formed by an upright support rod extending vertically above a fixing stud, a rear leg is formed by both a lower support rod extending on a diagonal line joining the upper end of the front leg and the lower end of the rear leg and an upper support rod contiguous to the lower support rod in an upper position relative to the lower support rod, the upper support rod being curved accurately and inclined rearward and upwards, and an energy absorber is mounted bridge wise as a diagonal member between the upper end portion of the front leg and the lower end portion of the rear leg, to constitute a leg structure. Accordingly to this leg structure, a striking energy is absorbed by an anti-plastic deformation force induced when the rear leg and the energy absorber is deformed plastically under an impact larger than a predetermined value, and the seat is held at its supported posture in normal use. This leg structure can be utilized not only in aircraft but also in automobiles and railway vehicles.

A major difference between the current invention and the prior art is the ability to determine the exact position of the system under any give load and direction of the load. In the prior art, different impacts will apply different forces on the energy absorbing components. Greater load applied on the rear leg, will change the orientation of the seat differently than forces applied mainly on the front leg.

The change in orientation will affect the forces transferred to the occupant from the energy absorbing components (legs and cylinder).

Thus, if a simple, analytical and repeatable system is desired with optimized energy absorption mechanism, it is better to use a system with only one deforming component (i.e. spiral).

Designing a system with specific force-deflection curve which transfers predetermined forces to the occupant requires careful design of the mechanism and the use of a highly controllable EA element such as the spiral.

US Patent application 20030209926 discloses a child seat device formed of a base to be placed on a seat of a car, a child seat body placed on the base, and a connecting member for connecting a rear bottom of the child seat body to a fixed portion. The connecting member increases a length thereof while absorbing a kinetic energy of the child seat body when a tension higher than a predetermined value is applied thereto from the child seat body.

Hence there is a long felt and unmet need to provide a simple and cheap vehicle passenger safety seat which absorbs energy in tension and compression suitable for mass production.

SUMMARY OF THE INVENTION

It is hence one object of the invention to an energy absorbing device adapted for carrying a passenger seat. The aforesaid device comprises (a) a base fixedly attached to a pre-existing vehicle; (b) a member displaceable relative to the base; and (c) at least one energy-absorbing arrangement interconnecting the base and displaceable member.

It is a core purpose of the invention to provide the energy-absorbing arrangement comprises a plastically deformable absorbing element in response to stresses greater than a predetermined threshold stress.

Another object of the invention is to disclose the plastically deformable absorbing element which is a helically configured ribbon having spaced-apart ribbon laps.

A further object of the invention is to disclose the plastically deformable absorbing element which is compressible or extendable.

A further object of the invention is to disclose the base connected to the vehicle by means of a connector meeting ISOFIX 13216.

A further object of the invention is to disclose the energy-absorbing arrangement comprising a hingely interconnected four-bar sub-arrangement configured be reshaped angularly when the device is stressed; angular reshaping is controlled by the deformable element secured to the base and connected to the four-bar sub-arrangement.

A further object of the invention is to disclose the energy-absorbing arrangement comprising a slideway and a slide linearly displaceable along the slideway; linear displacement of the slide relative to the slideway is controlled by the deformable element interconnecting the slideway and slide.

A further object of the invention is to disclose the slideway comprising two orthogonal rails configured for sliding the slide in two orthogonal directions.

A further object of the invention is to disclose the slideway comprising a plurality of rails configured for sliding the slide in a plurality of directions angularly different from each other.

A further object of the invention is to disclose the energy-absorbing arrangement comprising a turning arrangement configured for a smooth rotation of the displaceable member.

A further object of the invention is to disclose the energy-absorbing arrangement comprising a six-bar-hinged sub-arrangement configured for controllable linear displacement. The sub-arrangement has an axis of symmetry passing through two opposite hinges. The deformable element ties the opposite hinges.

A further object of the invention is to disclose the displaceable member configured for carrying a driver/passenger seat.

A further object of the invention is to disclose the seat connected to the base by means of at least one belt.

A further object of the invention is to disclose the seat comprising a seat back.

A further object of the invention is to disclose the plastically deformable absorbing element which is made by means of technology selected from the group consisting of casting, injecting, eroding, molding, wire twining, machining, forming, bending and any combination thereof.

A further object of the invention is to disclose the plastically deformable absorbing element selected from the group consisting of: an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating a tube/strap/cable absorber, a tube flaring, a housed coiled cable absorber, a bar-through-die absorber, a hydraulic absorber, a pneumatic absorber and combinations thereof.

A further object of the invention is to disclose a method of attenuating the acceleration applied to a passenger due to impact. The aforesaid method comprises steps of: (a) providing the device comprising (i) a base fixedly attached to a pre-existing vehicle; (ii) a member displaceable relative to the base; and (iii) at least one energy-absorbing arrangement interconnecting the base and displaceable member; (b) fixedly attaching the base to the vehicle; (c) fixedly attaching the passenger seat to the base; (d) accidently applying the impact to the vehicle; (e) displacing the displaceable member relative to the base; and (f) attenuating the effect of the impact on the passenger.

It is another core purpose of the invention to provide the step of attenuating the effect of the impact on the passenger performed due to plastic deformation of the energy absorbing element in response to stresses greater than a predetermined threshold stress.

BRIEF DESCRIPTION OF DRAWINGS

FIG. 1a presents a proposal for allowable chest acceleration and deflection levels, depicting ranges of acceleration and deflection acceptable for human subjects.

FIG. 1b presents a table of acceptable injury criteria. [Development of Improved Injury Criteria for the Assessment of Advanced Automotive Restraint System (National Highway Traffic Safety Administration, 1998)]

FIGS. 9a and 9b illustrate the child seat mounted onto the base system;

DETAILED DESCRIPTION OF PREFERRED EMBODIMENTS

The invention discloses a vehicle passenger seat having an improved impact performance. In an embodiment suitable for children, the seat is composed of two parts, a stationary base and a sliding seat. The sliding seat slides on a linear slide that is attached to the stationary base. The stationary base is preferably restrained by means of the existing passenger seat belts of the vehicle, and the passenger is restrained to the sliding seat by means of additional seat belts attached to the sliding seat. The sliding seat is restrained from free motion by means of an energy-absorbing element. In an embodiment suitable for adults, the seat is made of a single section that is connected to the vehicle by means of the aforementioned energy absorbing element.

When a vehicle undergoes impact, it may experience a large acceleration which for human beings can often be injurious or fatal. The acceleration experienced depends upon the difference between initial and final velocities and the distance over which the acceleration occurs, $$a = \frac{\Delta v^2}{2d} \qquad \text{Equation 1}$$

Where Δv is the change in velocity, d is the distance over which the acceleration occurs, and a is the acceleration experienced. It will be seen that for a given Δv (which in many cases cannot be controlled, as in a crash where a car goes from cruising speed to zero) the acceleration experienced will be decreased by increasing d. Thus allowing the passenger of a vehicle as large a degree of travel within the vehicle body as possible may decrease the accelerations experienced to a less-injurious level. Similarly if the energy of the impacting object can be reduced, its velocity will be reduced and Δv will be decreased. In a seat intended to carry an infant, the available travel d is limited, ultimately by the distance to the front seats. Thus given some initial and final velocities, the acceleration transmitted over the distance d should be the maximum level acceptable without causing injury, to minimize the required travel and therefore volume of the system. By designing the system this way one decreases the probability of a sudden injurious acceleration when the device reaches the end of its travel.

Figure 2A:
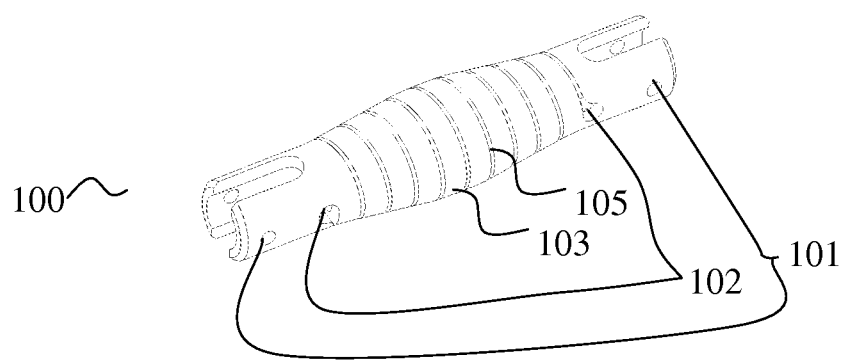
FIGS. 2a and 2b are views of the energy absorbing component of the current invention.

In FIG. 1a, maximum acceptable acceleration and chest compression levels are presented as developed by the National Highway Traffic Safety Administration in 1998. FIG. 1b presents the maximum injury levels: Head Injury Criterion (HIC) of 1000; 60 G's of acceleration and 76 millimeters of chest deflection; 10,000 Newtons of force on the femurs, neck injury criteria of Compression of 4000 N, Tension of 3300 N; Shear of 3100 N; Flexion of 410 Nm; and Extension 125 Nm, thorax (rib and spine) acceleration of 85 to 90 g, and allowable pelvic criterion 130 g. One may appreciate from these data that injury can be avoided if the accelerations are low enough and/or the durations or compressions are small enough that the 'injury zones' of FIG. 2a are avoided. It will be understood by one familiar with the field that this is a representative graph, and different regions may become evident with different research.

In an embodiment suitable for children, the invention discloses a vehicle passenger chair composed of two parts, a stationary base and a sliding seat. The sliding seat slides on a linear slide that is attached to the stationary base. The stationary base is preferably restrained by means of the existing passenger seat belts of the vehicle, and the passenger is restrained to the sliding seat by means of additional seat belts attached to the sliding seat. The sliding seat is restrained from free motion by means of an energy absorbing element, which for example may comprise a spring-like helical element that deforms under tension in a precisely controlled and tested manner. This helical element can be designed that it delivers only the maximum allowable acceleration to the sliding seat, and no more, thereby reducing the accelerations experienced by the passenger.

Figure 2B:
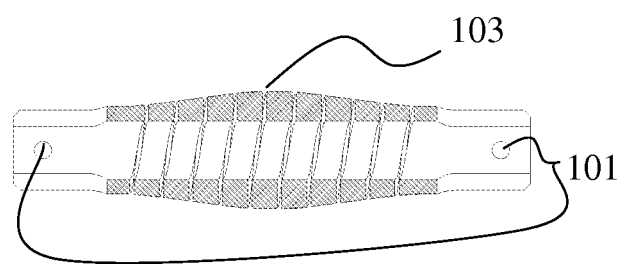

A possible energy absorbing element is now described. This is a spring like helical element that stretches in a predictable way under tension. One embodiment of this device is shown in FIGS. 2a-2b. The retaining holes 101 are used to install the member 100. In the embodiment of FIGS. 2a and 2b, a varying cross section 103 is employed. The member 100 is designed for use in tension, and will be deformed plastically when a high enough force is applied to it. The "plastic" regime refers to a range of stress for which deformation without subsequent retraction will occur, as opposed to the spring-like "elastic" regime of stress wherein a body will generally return to its original configuration. When this stress level is met or exceeded, a deformation of the member will occur. This deformation consists of an 'unwinding' of the device along the helical cut 105. To relieve the twist undergone by the device as well as relieving the stress concentration at the end of the helical cut, strain relief slots 102 (FIGS. 3c and 3d) are employed in the preferred embodiments. Other forms of provision for stress relief will be obvious to one skilled in the art. Furthermore, it is within provision of the invention that rotation of the energy absorbing member either be prevented or allowed to a predetermined degree, therefore allowing control over the force-vs.-travel curve of the device.

It should be understood that the plastic deformation region is only reached when the force applied to the energy absorbing element is greater than a certain threshold. When the applied force exceeds this threshold, only the threshold force is transmitted by the device to the rest of the system it is protecting. This threshold force can be fixed by varying the cross section of the device, or after a given wall thickness has been produced, by varying the pitch of the helical cut 105. The helical cut 105 can be carried out after mass production of the mechanisms, allowing parameters of the device such as ultimate travel length and threshold reaction force to be varied according to need, after mass production of the energy-absorbing element. Another advantage of the current invention over the prior art is that the rest of the system is reusable. The energy absorbing device is the only part to experience plastic deformation; this device can be replaced.

Figure 3:
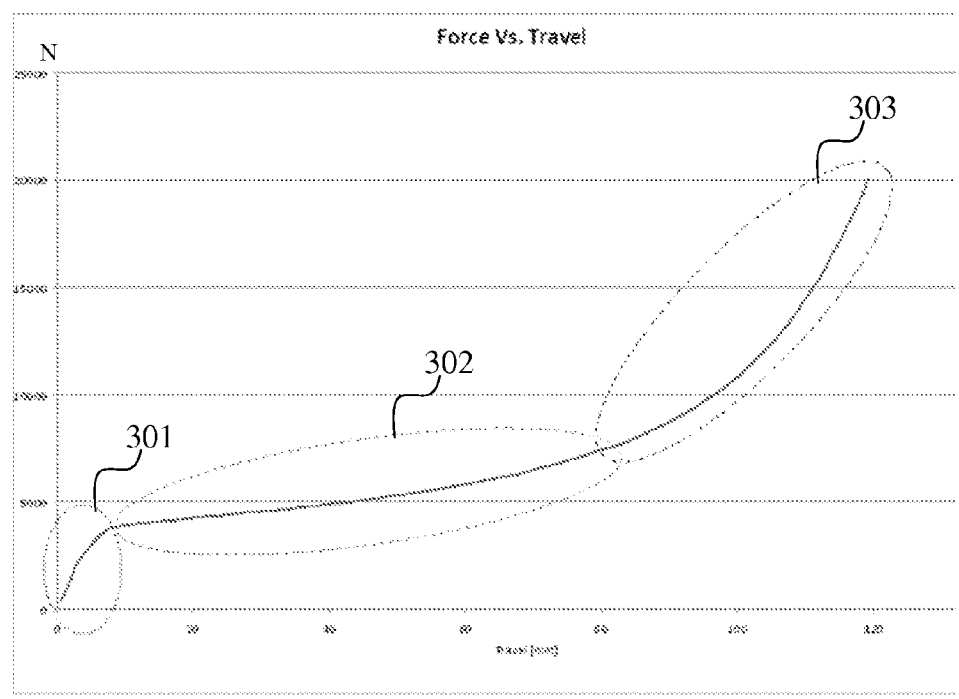
FIG. 3 is an exemplary graph of the force (y-axis, in Newton) vs. travel (x-axis, in mm) of one embodiment of the energy absorbing component of the current invention.

With reference to FIG. 3, one can appreciate the different regimes of the force vs. travel curve of one possible energy-absorbing member of the current invention, namely the spiral member of FIGS. 2a and 2b. In the elastic regime 301, the device behaves in a spring-like fashion, with a linear relation between applied force and travel, and with return of the element to its original configuration after removal of the applied force. In the plastic regime 302, which is reached rather quickly, after little travel, the force one can apply to the element remains largely constant, rising only slightly with continuing deformation of the energy-absorbing member. In the end regime 303 the force increases more and more rapidly with continuing displacement. The characteristic of a short elastic regime and a plastic regime lasting the maximum length of travel allowable is desirable in this system, since this way almost no travel is 'wasted' without providing a reaction to the applied force. Furthermore, nearly the entire travel provides the almost the exact required reaction force, as calculated in the theoretical design, as shown in the graph (FIG. 6b). Obviously this graph is appropriate to a particular embodiment and other graphs will be desirable in different situations (such as different mounting points—wall or floor, different expected acceleration range, and the like). The plateau region of the graph has the desirable effect of transmitting the force of the impact without causing injury, while absorbing as much impact energy as theoretically possible, decreasing the probability of a sudden injurious acceleration when the device reaches the end of its travel. This sudden acceleration would occur if not enough impact energy was absorbed; it is for this reason that the maximum allowable acceleration should be transmitted, without exceeding this amount. It will be appreciated by one skilled in the art that the relation depicted in FIGS. 4a and 4bb is non-trivial and quantitatively different from the force-displacement curve one would obtain with a simple metallic rod, spring, or the like. It should also be appreciated that the exact form of the curve, including the maximum travel, and the value of the applied force during the plastic regime, can both be tuned easily by changing the length of the energy-absorbing device, the pitch of the helical cut, the cross section size and shape, material, installation method, and design of the mechanical system into which the energy-absorbing element is placed.

The absorbing component is made of a plastically-deforming material such as but not limited to plastic, low carbon steels, stainless steels, composite materials, and others as will be obvious to one skilled in the art. The use of plastic for a child seat may be particularly apt since the masses involved in limiting a child-seat acceleration are relatively low, the mass of the child being perhaps 10-20 kg and the mass of the 'sprung weight' of the seat being similar. One embodiment of the energy absorption component takes a helical spring-like form, designed to experience plastic deformation over a desired deformation length, under a desired impact load threshold. The operating characteristics [namely the stress-strain curve, and thus the deformation length impact load threshold and acceptable load range for the system to be protected] of the mechanism can be controlled by the following parameters:

Element cross section shape and thickness;
Winding pitch [number of revolutions per length];
Length; and
Material A device incorporating one or more of the energy absorbing components of the current invention will also be tunable by changing the number of energy absorbing components used and the mechanical design of the system into which the energy absorbing component(s) is/are placed.

One advantage of the invention is that it can be installed as part of an add-on component to an existing, original vehicle seat, just as a common vehicle baby seat is installed on top of an existing car seat and is restrained by the existing restraining belts. The solution can be tailored to fit several different types of seats and vehicles, and as described above, different impact load behaviors can be easily arranged. The device parameters are affected by several factors including: platform structure and weight; available clearance from the seat ahead; expected occupant size and mass, and the like.

Figure 4A:
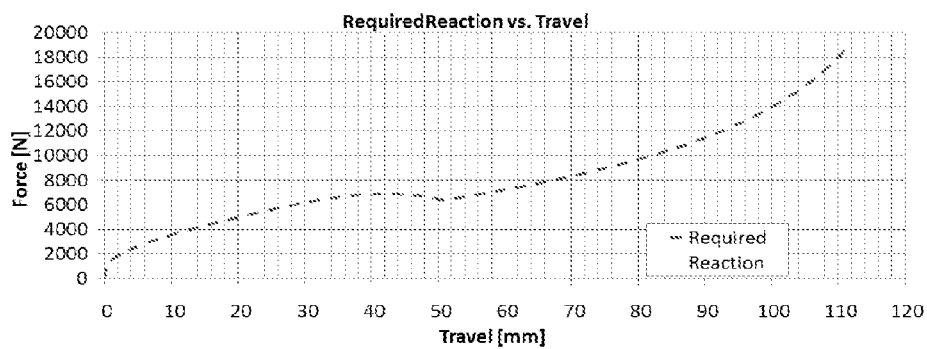
FIG. 4a is an exemplary graph of the necessary force vs. travel required of an energy absorbing component to cause an output acceleration within the allowable parameters given by the human body endurance graph, for an occupant of average weight, when installed in a standard four-bar mechanism.
Figure 4B:
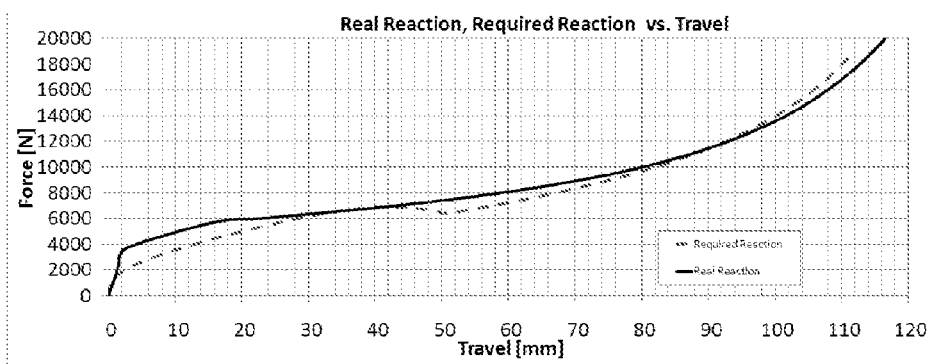
FIG. 4b superimposes the curves of FIG. 3 and FIG. 4a for purposes of comparison.

When placed in a suitable assembly, the force-displacement curve of the energy-absorbing element required to produce the desired force-displacement curve on the seat and occupant will take a form like that shown in FIG. 4a. A comparison of the desired profile of FIG. 6a with the actual (measured) profile is shown in FIG. 4b. One sees that the profile provided is nearly exactly the theoretically desired curve. This verifies the correct operation of the device as can be determined by simulation.

Figure 4C:
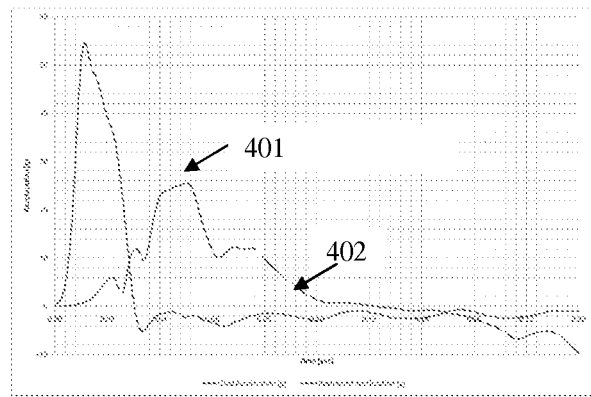
FIGS. 4c and 4d superimpose desired and actual accelerations for purposes of comparison.
Figure 4D:
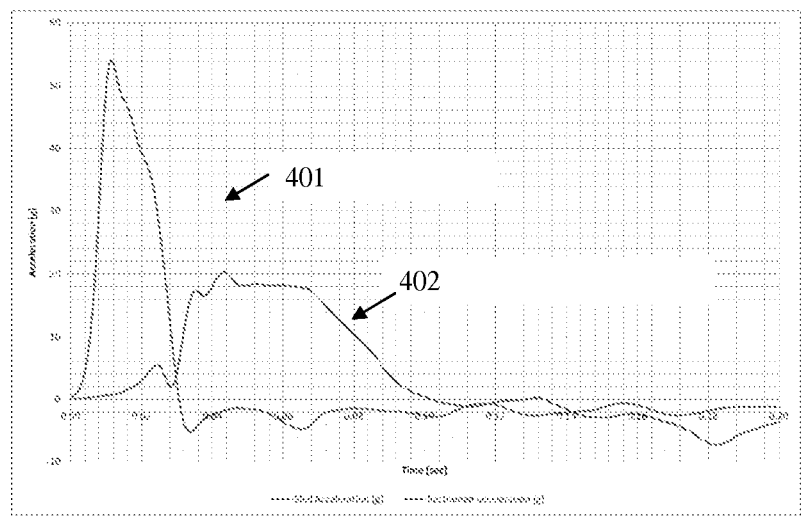

For 'real' proof of correct operation, the device must be tested under actual impact. The device is placed into a test fixture that impacts the device with a predetermined load. The test fixture measures input and output accelerations and records them. The correct operation of the device under actual impact is shown clearly in the experimentally measured curves of FIGS. 4c and 4d. These figures are graphs of measured acceleration vs. time for sled-tests in which sleds holding accelerometers are accelerated. As shown in FIGS. 4c and 4d, the accelerometer is attached to a seat that is attached to the sled by way of the restraint of the current invention. As is clear from the figures, the accelerometer restrained by the current invention indeed undergoes a reduced acceleration.

A curve 401 shows a temporal dependence of the measured input acceleration applied to a vehicle body by a sled upon which the device is accelerated. A curve 402 presents a temporal dependence of the measured output acceleration of the seat which is connected to the sled by means of the energy absorbing member.

Another useful aspect of the system lies in the fact that due to the plastic deformation of the energy absorbing element(s), rebound is minimized (unlike the case for example if using a spring, which after being compressed/extended will tend to return to its initial state). Rebound energy is absorbed by further distortion of the energy absorbing element, generally into an S-shape. This is a very useful characteristic since the added acceleration of any rebound forces will increase the danger to the occupant. In fact the energy absorbing device of the invention has a tendency to absorb any rebound due to the rest of the system since even after being stretched to its maximum extent, it tends to resist being pushed back to a less-stretched position. In practice it becomes bent into an 'S' shape that will resist compression to some degree and absorb the rebound forces of the system. The seat mechanism may be installed directly on the vehicle seat by means of the vehicle restraining belt. Alternatively the device may be adapted to fit into a base that is itself attached to the vehicle e.g. by means of the restraining belts, or an additional bracket. This bracket may be attached to the roof, seat, floor, or other point of the vehicle. This embodiment may be found advantageous to decrease the loads transmitted to the shock-absorbing seat, since the roof or floor will experience a lesser load due to energy absorption of the vehicle frame (which includes crush zones, for example). This will act to dampen the impact transmitted to the seat attachment bracket and reduce the impulse delivered to the rest of the vehicle. Thus from the standpoint of energy delivery, it may be advantageous to attach the seats to the floor or even the roof of the vehicle, these being points as far as possible from the point of impact. On the other hand from the standpoint of installation practicality, it may be advantageous to attach the seat to the existing seat of the vehicle. It will be appreciated by one skilled in the art that the present invention allows for all of these installation options.

Figure 5A:
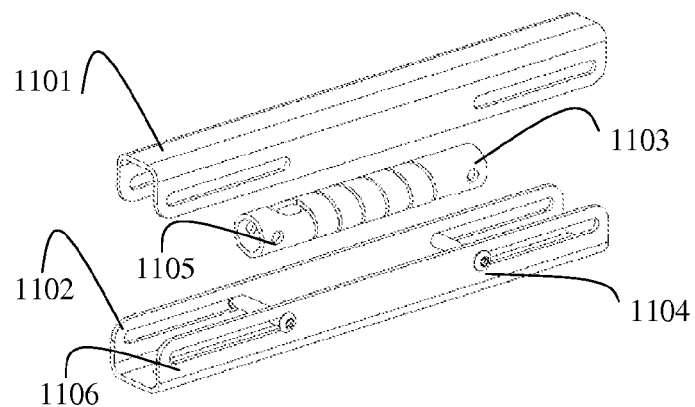
FIGS. 5a-5c illustrates energy absorbing slides.
Figures 5B, 5C:
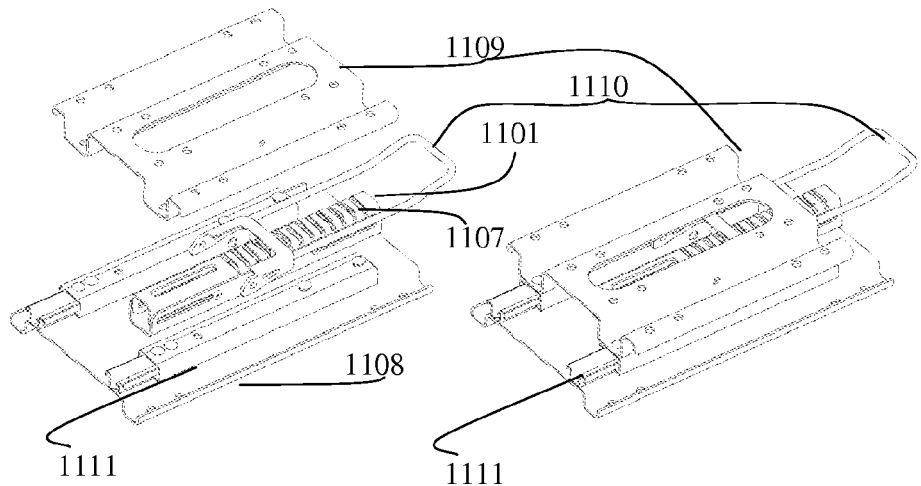

In a preferred embodiment the seat travels on a slide or rails. Advantages of using a mechanism of this sort include simplicity, no requirement for accurate bearings or bases, and low cost. In FIGS. 5a-5c an example of rails adapted for use in the current invention is shown. As will be obvious to one skilled in the art, any mechanism allowing forward motion can be used instead of the linear rails used in this particular embodiment. For example motion along a curved path leading fore and downward will tend to increase the distance of the occupant from the dashboard during collisions. Furthermore, the linear slide itself can form an energy absorbing element. For example if the rails are slightly non-parallel, as the seat slides upon the rails it will encounter increasing resistance and will tend to deform the rails and thereby dissipate energy as it moves forward. The top half 1101 is adapted to attach to a vehicle seat, which rests upon it. The top half 1101 slides upon the bottom half 1102, which is attached to the vehicle floor, existing seat, or other point or points in the vehicle. The travel of the top half 1101 upon the bottom half 1102 is restrained by means of the energy absorbing element 1103, which is provided with holes 1105 adapted to accept pins 1104. As will be obvious to one skilled in the art, any energy absorbing element can be used here, including but not limited to those shown in FIGS. 3E-Q. The pins 1104 can slide within a channel 1106. As seen in the figure, their dispositions within the channel 1106 are such that a force upon the system, in either forward or backward directions (parallel to the direction of movement of the linear slide), can occur only by deformation of the energy absorbing element 1103. This is true for both accelerations and decelerations, for example head-on collisions (decelerations) and rear-end collisions (accelerations). FIG. 5b shows the assembled slide in its original configuration, while FIG. 5c shows the assembled slide after travel of the slide (and attendant deformation of the energy absorbing element (hidden by the top half 1101)). As detailed above, the energy absorbing component undergoes plastic deformation when subjected to tension, and the device thereby absorbs kinetic energy of impact, restraining the travel between seat and vehicle sufficiently to prevent travel longer than the length of the slide, while allowing enough travel to reduce accelerations appreciably.

Figure 6A:
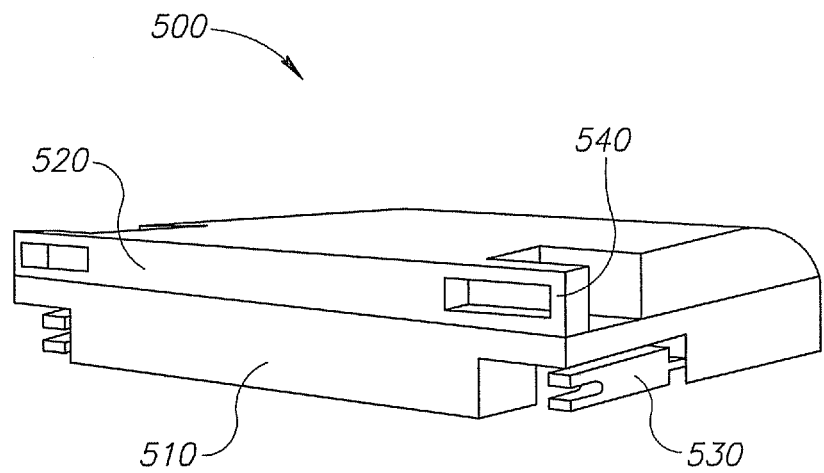
FIGS. 6a to 6c illustrate the base system.
Figure 6B:
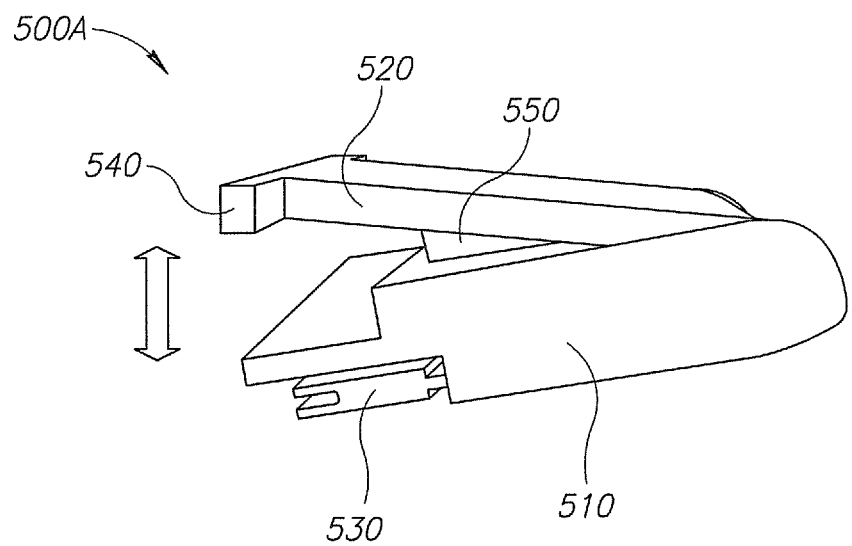
Figure 6C:
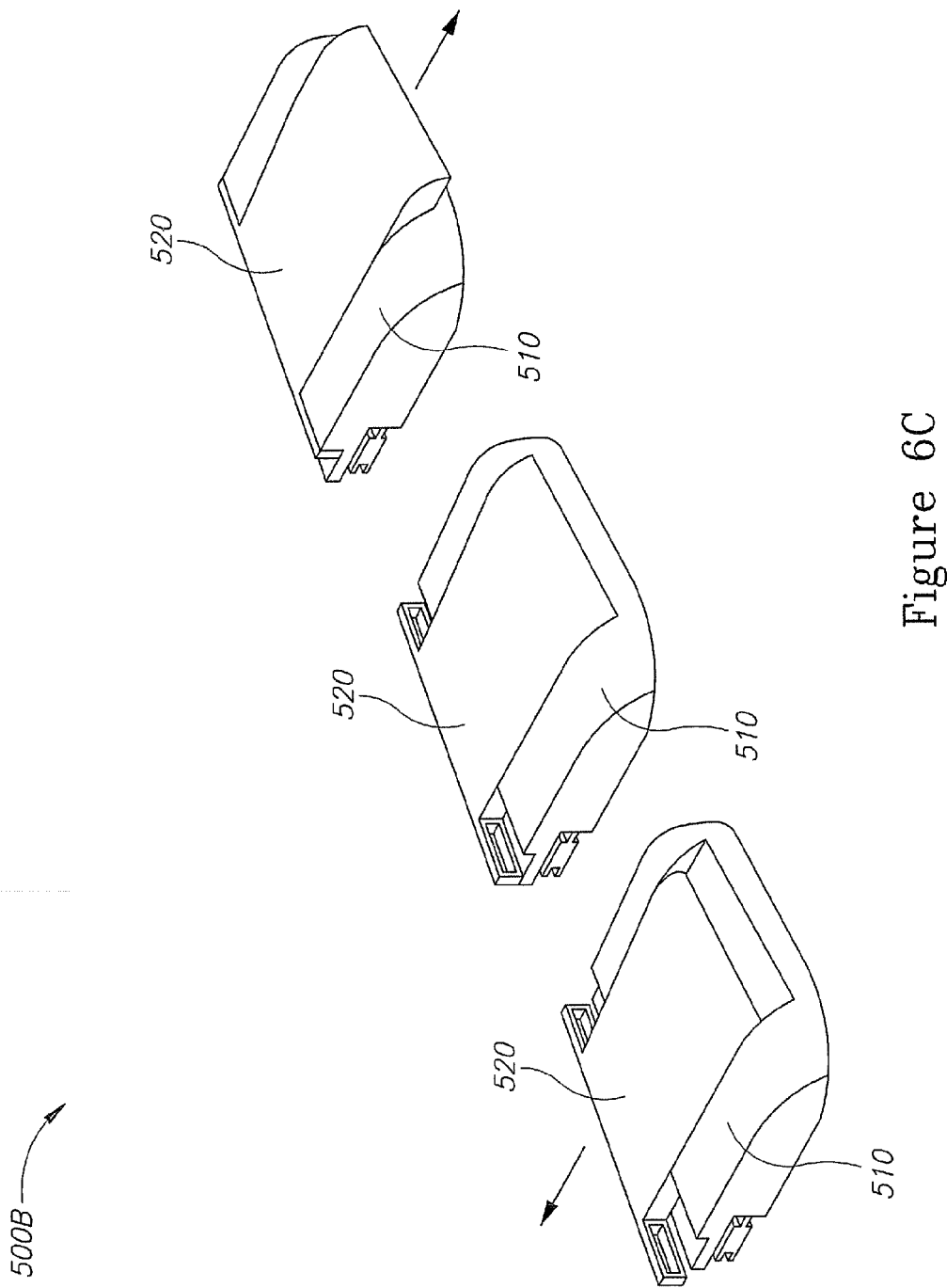

Reference is now made to FIGS. 6a to 6c presenting different embodiments of the base device 500, 500a and 500b. In general view, the base device comprises a base 510 fixedly attachable to a vehicle or to vehicle passenger seat (not shown). The member 520 is displaced ably connected to the base 510. The base 510 is attachable to the vehicle passenger seat by means of ISOFIX attaching means 530. Ears 540 are designed for fixation of the member 520 to a backrest (not shown).

As seen in FIG. 6b, the embodiment 500a provides rotational displacement of the member 520 relative to the base 510 in response to an accidental shock frontal to the vehicle. A energy absorbing element 560 decreases an acceleration applied to the passenger. In FIG. 6c, the embodiment 500b provides linear displacement of the member 520. An internal energy absorbing element is not shown.

Figure 7A:
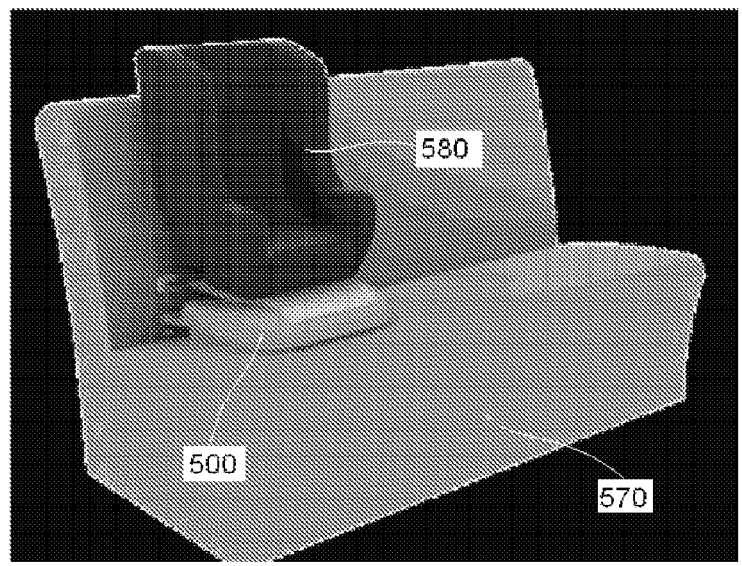
FIGS. 7a and 7b illustrate fixedly attaching the base system to the vehicle seat.

Reference is now made to FIG. 7a, presenting a general view of the base device 500 fixedly attached to a vehicle seat 570. The base device is provided with a child seat 580 fixedly attached to the aforesaid base device.

Figure 7B:
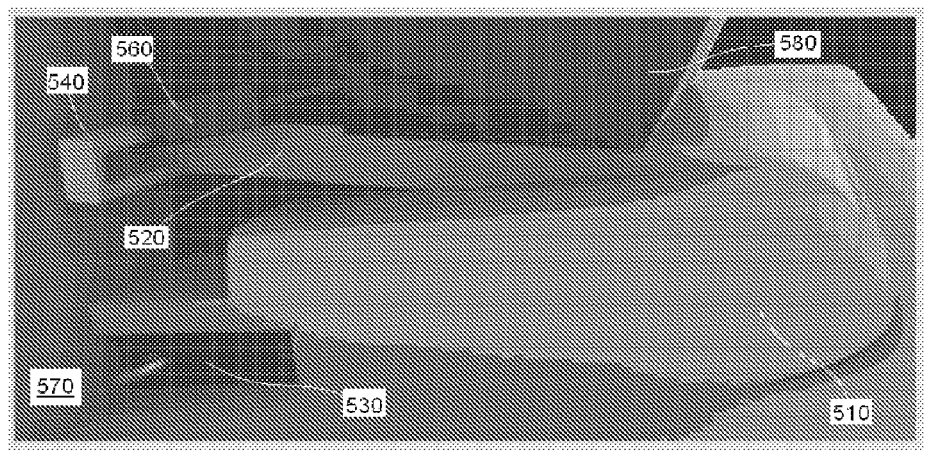

Reference is now made to FIG. 7b, presenting a proposed arrangement. The base 510 is fixedly attached to the vehicle seat 570 by ISOFIX means 530. The child seat 580 is mechanically linked to the ears 540 by ISOFIX means 560.

Figure 8:
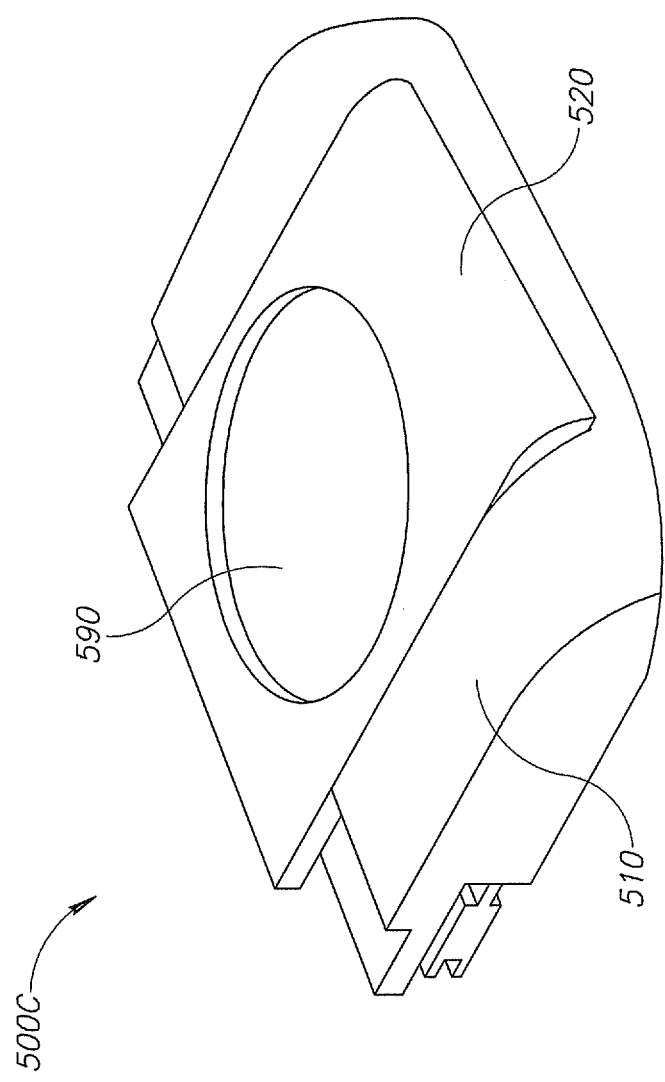
FIG. 8 illustrates the base system provided with the rotatable member.

Reference is now made to FIG. 8, showing an alternative embodiment 500c provided with a rotatable member 590 mounted onto the displaceable member 520. The rotatable member is adapted for carrying a child seat.

Reference is now made to FIG. 9, presenting the base device 500c with the child seat 580 mounted there onto. The base device 500c provides rotatability of the child seat 580.

Figure 10:
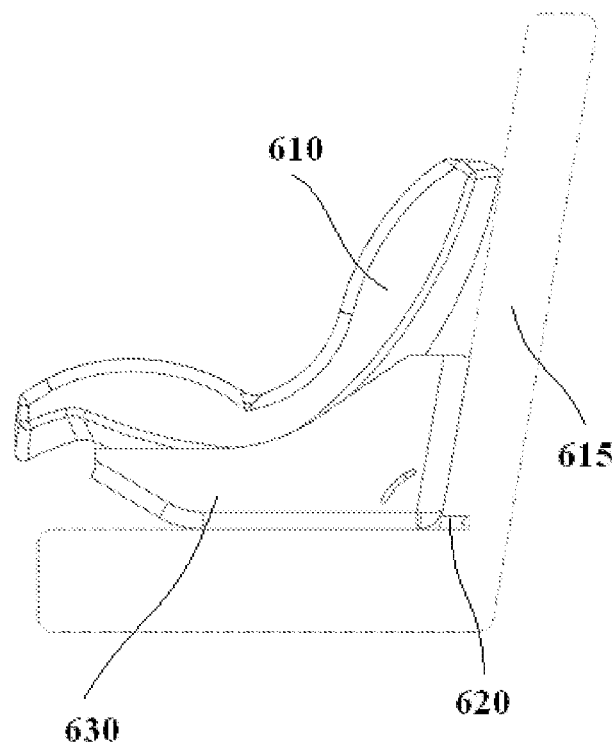
FIGS. 10 to 13 illustrate the four bar energy absorbing mechanism.

Reference is now made to FIG. 10, presenting a baby seat connection to a car. In accordance with the present invention, the baby seat 610 is connected to the base 630 which contains the motion mechanism and energy absorption component (not shown). The base 615 is connected to a passenger seat. The passenger seat 610 is mechanically connected to the base 615 either by means of ISOFIX connection or a seatbelt connection.

The connection of the baby seat 610 to the base 615 can also be done by the following manners: ISOFIX connection and a specific design for a particular seat/base. The motion mechanism can be designed or 1 or 2 axis as required by the application. The specific embodiments are described below. The present invention is characterized as a substantially rigid structure in the limit of technological achievability. The aforesaid structure is connected to an energy absorbing member, which absorbs the energy of the impact.

Figure 11:
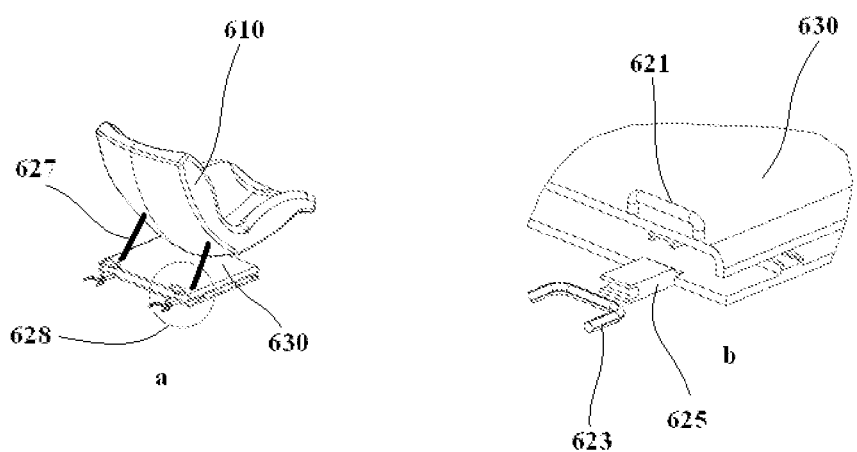

Reference is now made to FIGS. 11a and 11b, presenting exemplary embodiment of the present invention. The baby seat 610 is connected to the base 630 by connecting means 627 (for example, belts). Numerals 623 and 625 refer to an ISOFIX pair of an anchor and a clip for a connection of the base 630 to the passenger seat (not shown). An anchor 621 is designed for a connection of the baby seat 610 to the base 630.

Figure 12:
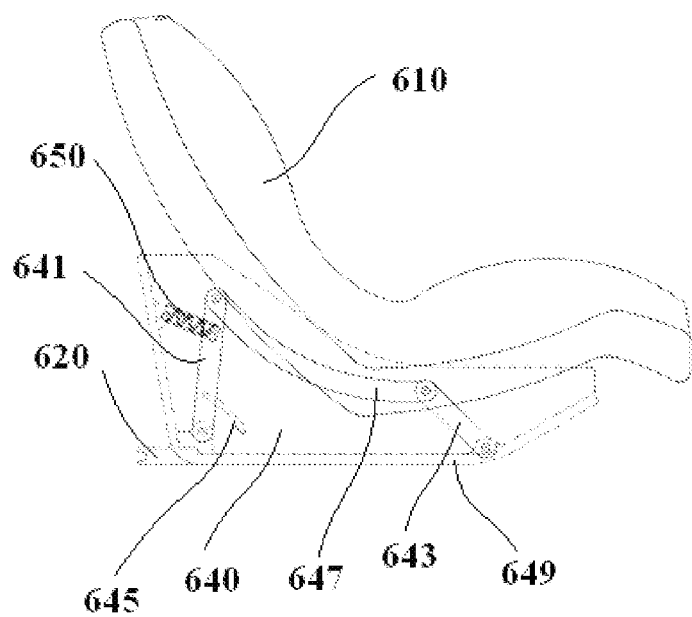
Figure 13:
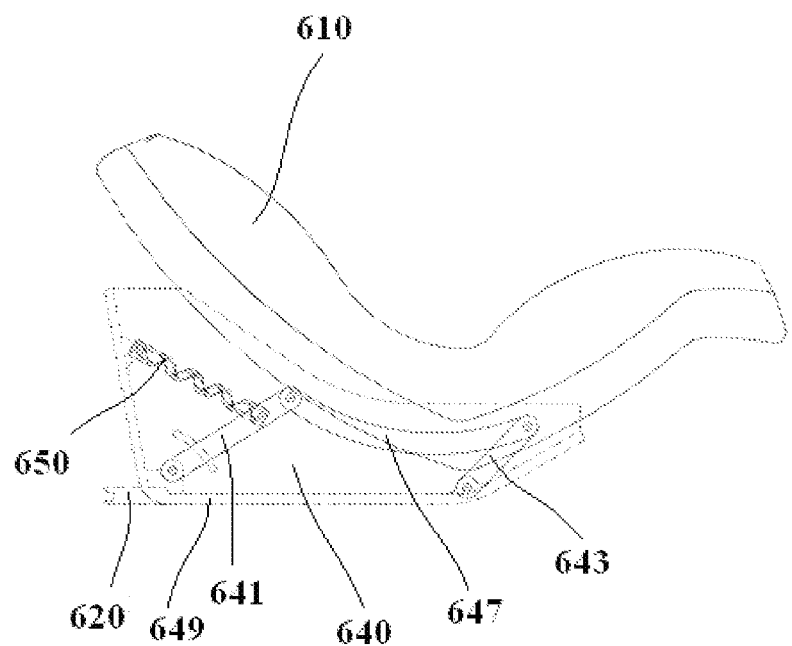

Reference is mow made FIGS. 12 and 13, presenting a first embodiment of the present invention. The arrangements of the bar motion mechanism 640 depicted in FIGS. 12 and 13 correspond to their positions before and after an impact, respectively. The motion mechanism 640 comprises bars 641, 643, 647 and 649 hinged to each other. As affected by an impact, the baby seat 610 displaces right (FIG. 13). The energy of the impact is partially absorbed by an energy absorbing member 650 which expands under the action of the impact. A range of rotation of the bar 641 is limited by a slot 645. The invention can be embedded into existing commercially available seat or seat base, without essential modification of the seat design. The introduction of the energy absorbing element into the seat arrangement is completely seamless to a user.

The energy absorbing element 650 can be selected from the group consisting of: an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating a tube/strap/cable absorber, a tube flaring, a housed coiled cable absorber, a bar-through-die absorber, a hydraulic absorber, a pneumatic absorber and combinations thereof.

Figure 14:
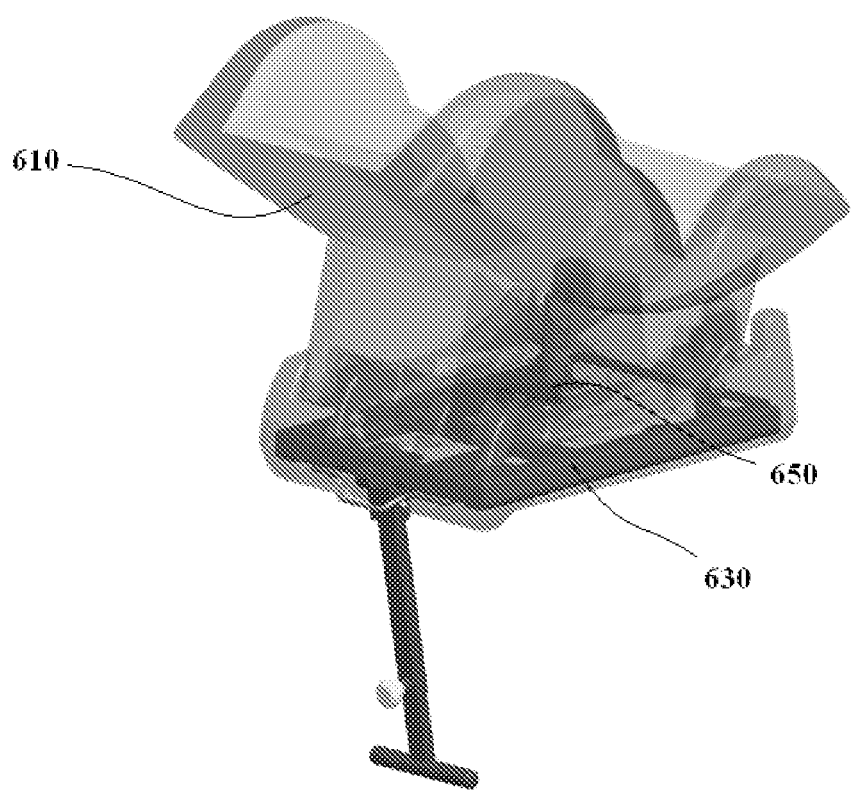
FIGS. 14 and 15 illustrate the energy absorbing element embedded into the commercially available baby seat.
Figure 15:
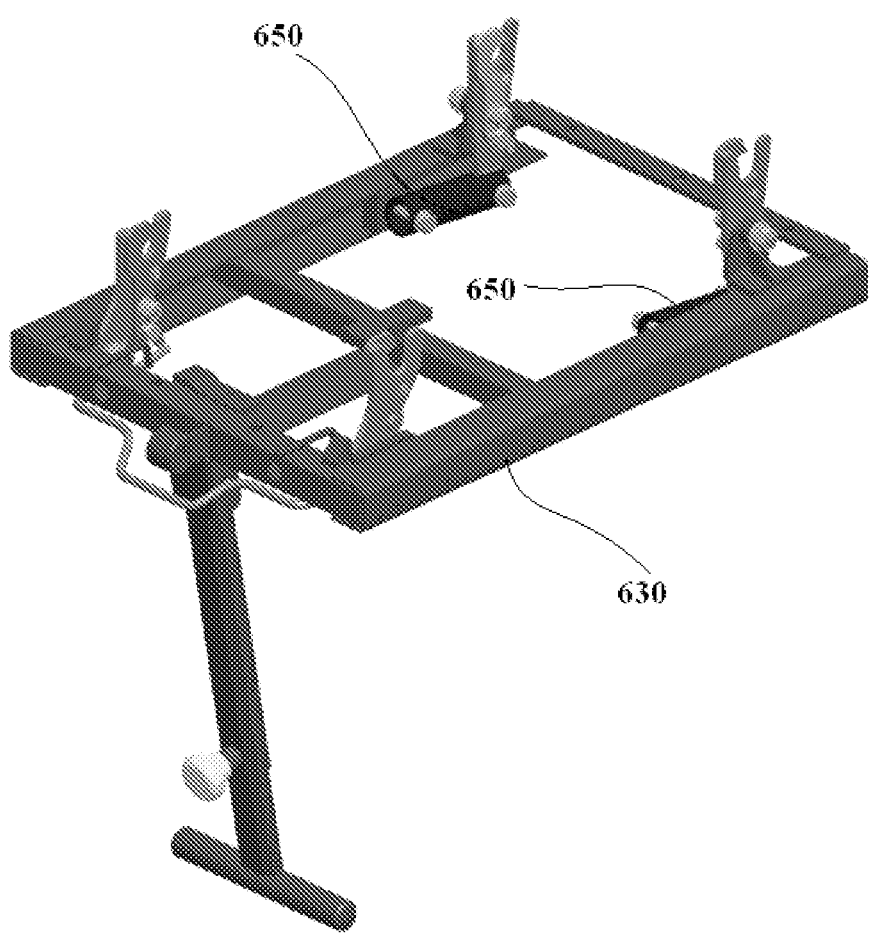

Reference is now made to FIGS. 14 and 15, presenting an exemplary technical solution, in which the energy absorbing element 650 is embedded into a commercially available baby seat arrangement including the seat 610 and the base 630. The energy absorbing element 650 interconnects the parts 610 and 630. In accordance with the preferred embodiment of the present invention, the energy absorbing element 650 comprises an expandable spiral member. The spiral member can be replaced by any device recited in the previous paragraph.

The main advantage of the invention is the option of embedding the energy absorbing element into any existing seat design. The energy absorbing element can be embedded either into the base itself with no changes in the seat (demonstrated here in an exemplary manner only) or into the seat itself without a need for a specific base (not shown). The change does not affect the system functionality and can be implemented by utilizing the same connection techniques and existing space environment.

Figures 16A, 16B:
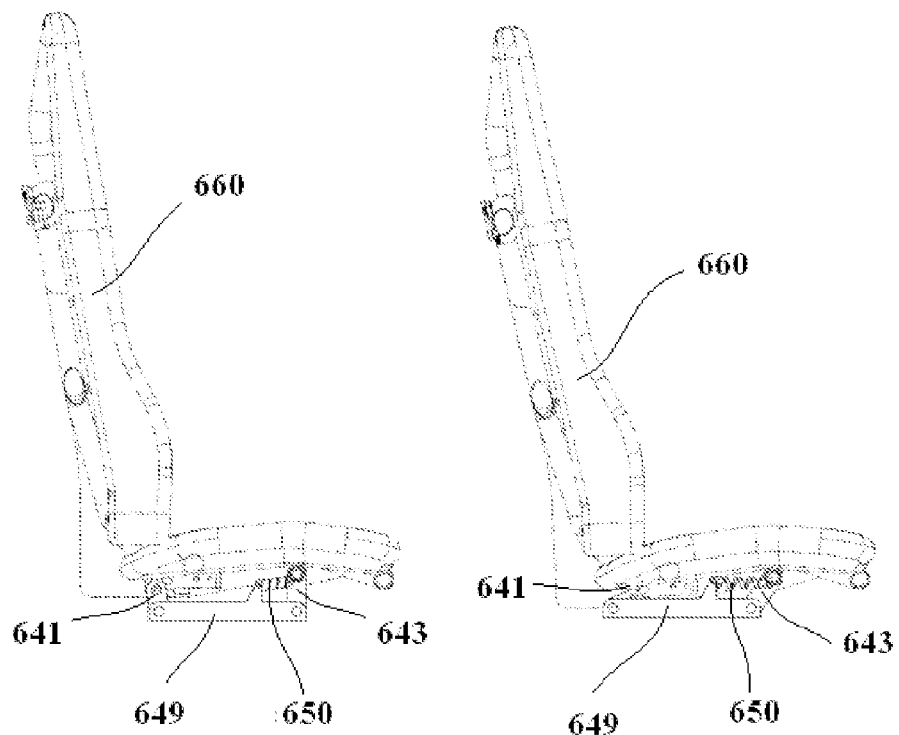
FIGS. 16a and 16b illustrate the embodiment of the invention adapted for an adult passenger.

Reference is now made to FIGS. 16a and 16b, presenting an embodiment of the invention adapted for an adult passenger 660. The aforesaid seat is mounted onto the four-bar motion mechanism interconnected with the vehicle through the energy absorbing element 650 (preferably, a spiral). As affected by an impact, the baby seat 610 displaces right (FIG. 16b). The energy of the impact is partially absorbed by an energy absorbing member 650 which expands under the action of the impact.

Figure 17:
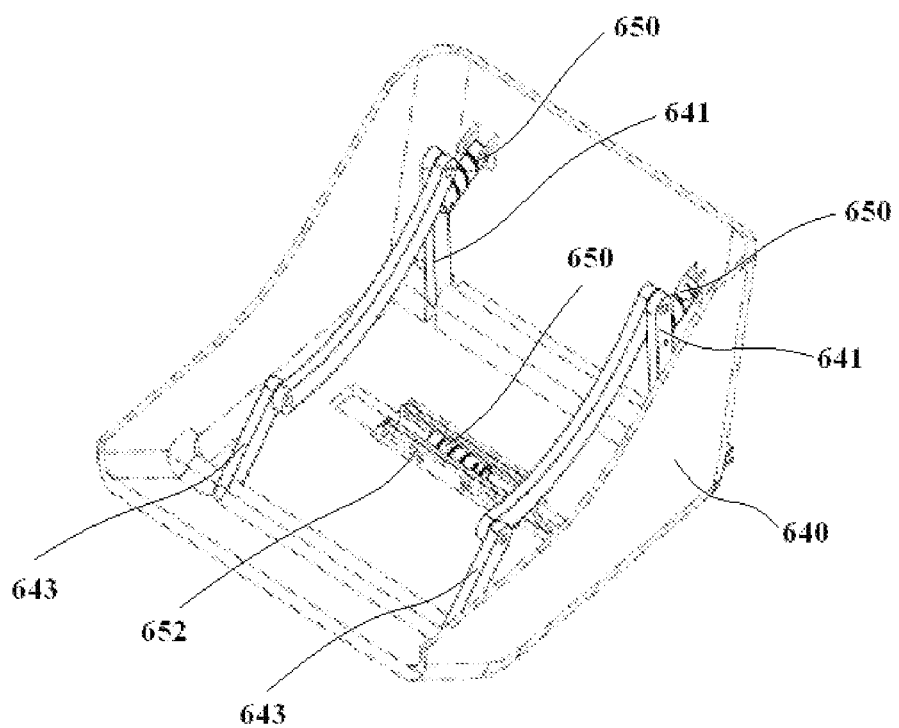
FIGS. 17 to 20 illustrate the embodiment of the invention provided with four-bar mechanism and a transverse slide.
Figure 18:
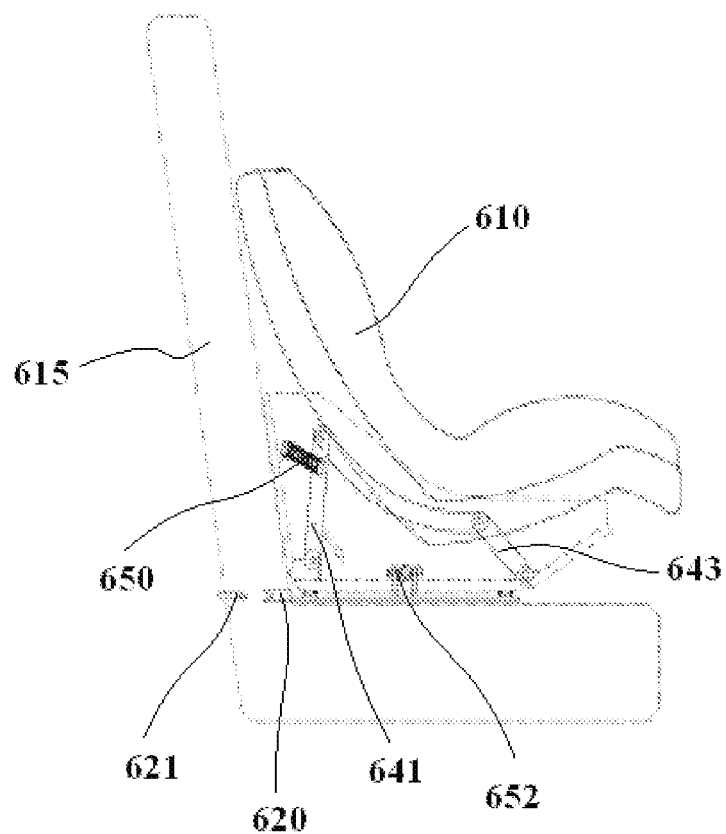

Reference is now made to FIGS. 17 and 18, presenting isometric and side views of a second embodiment of the invention. The motion mechanism is provided with a transverse slides 652. The baby seat 610 is displaceable along the aforesaid slides. As affected by a transverse impact, the baby seat 610 displaces along the slider 652. The energy absorbing element 650 interconnecting the baby seat 610 and the vehicle (not shown) absorbs at least partially the impact energy.

Figure 19:
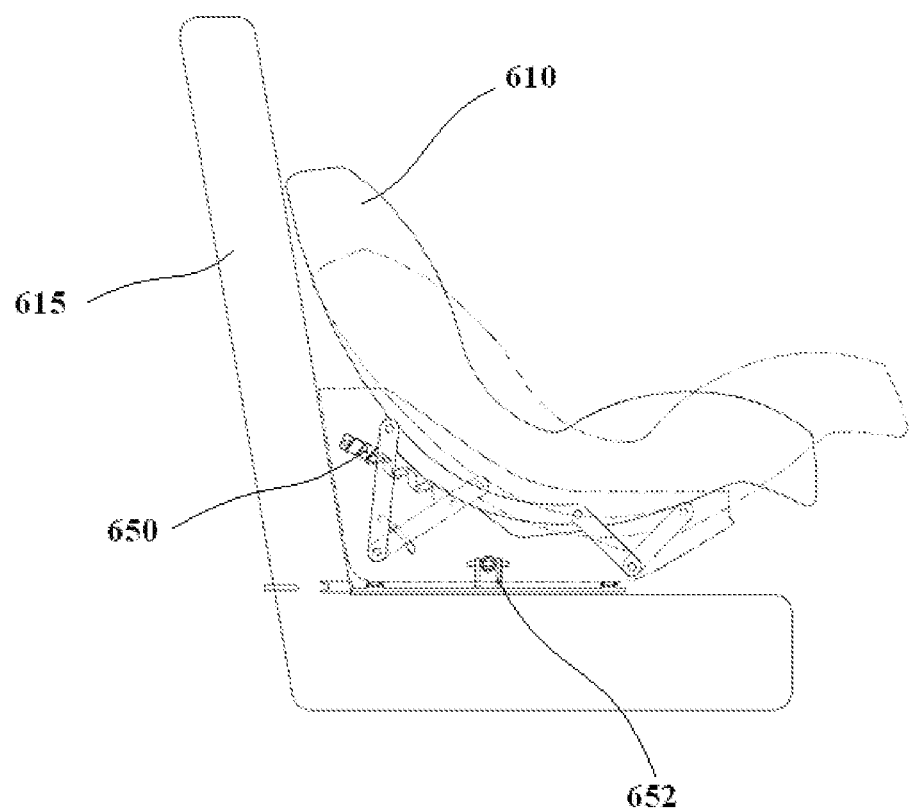

Reference is now made to FIG. 19, presenting arrangements corresponding to the seat positions placed onto the device depicted in the previous paragraph before and after the longitudinal impact.

Figure 20:
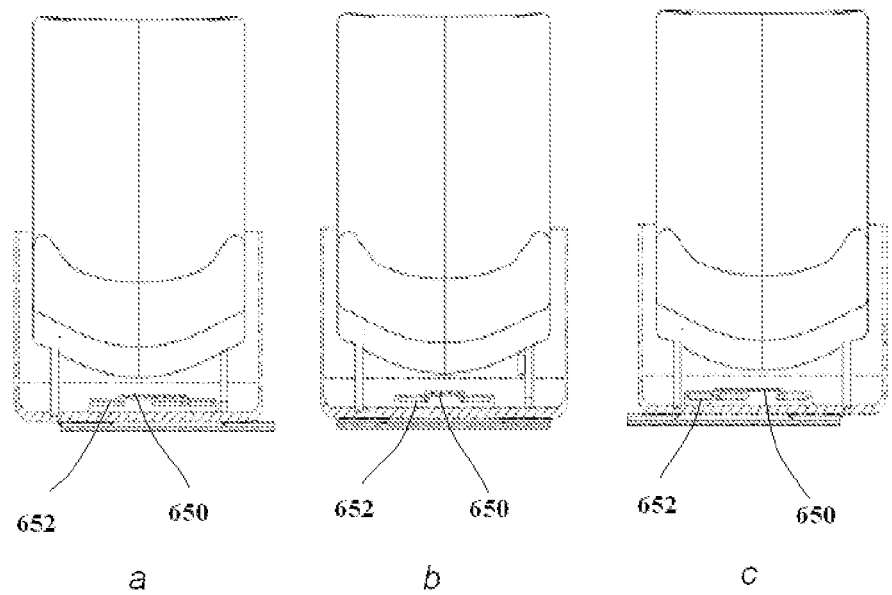

Reference is now made to FIGS. 20a, 20b and 20c. FIGS. 20a and 20c depict positions of the seat after right and left transverse impacts, respectively. FIG. 20b corresponds to the seat position before the impact.

Figure 21:
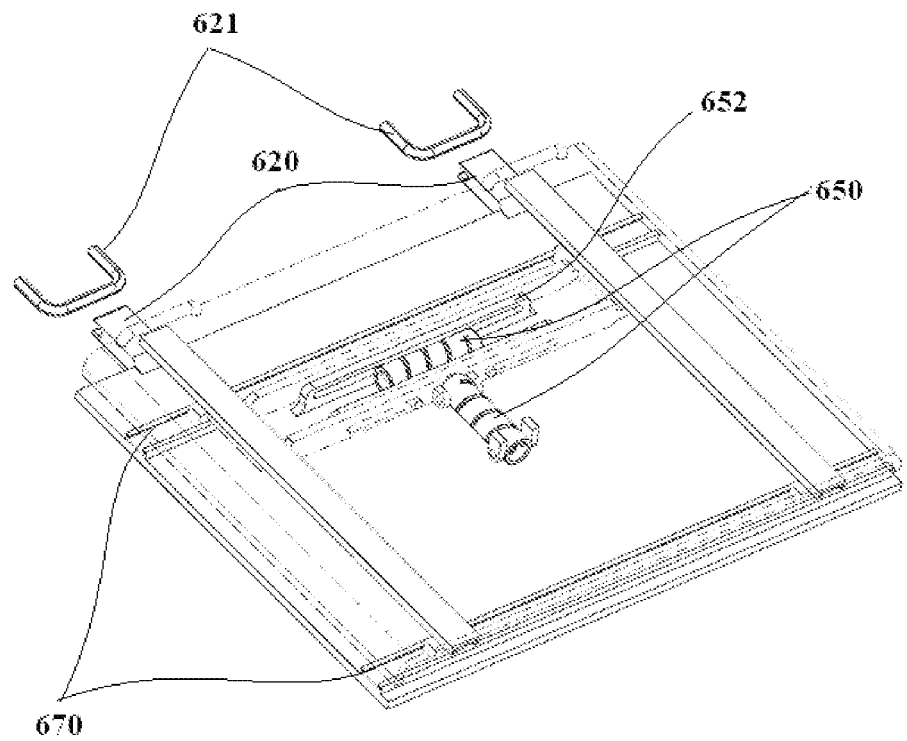
FIG. 21 illustrates the embodiment of the invention provided longitudinal and transverse slides.

Reference is now made to FIG. 21, presenting a third embodiment of the invention. The motion mechanism is provided with tow orthogonal slides configured for displacement of the seat (not shown) along longitudinal and transverse directions in the cases as affected by the corresponding impacts. Specifically, the motion mechanism comprises longitudinal slides (not shown) and transverse slides 670. As affected by transverse or longitudinal impact, the baby seat displaces along the slides while the energy absorbing elements 650 absorb at least partially the impact energy.

Figure 22:
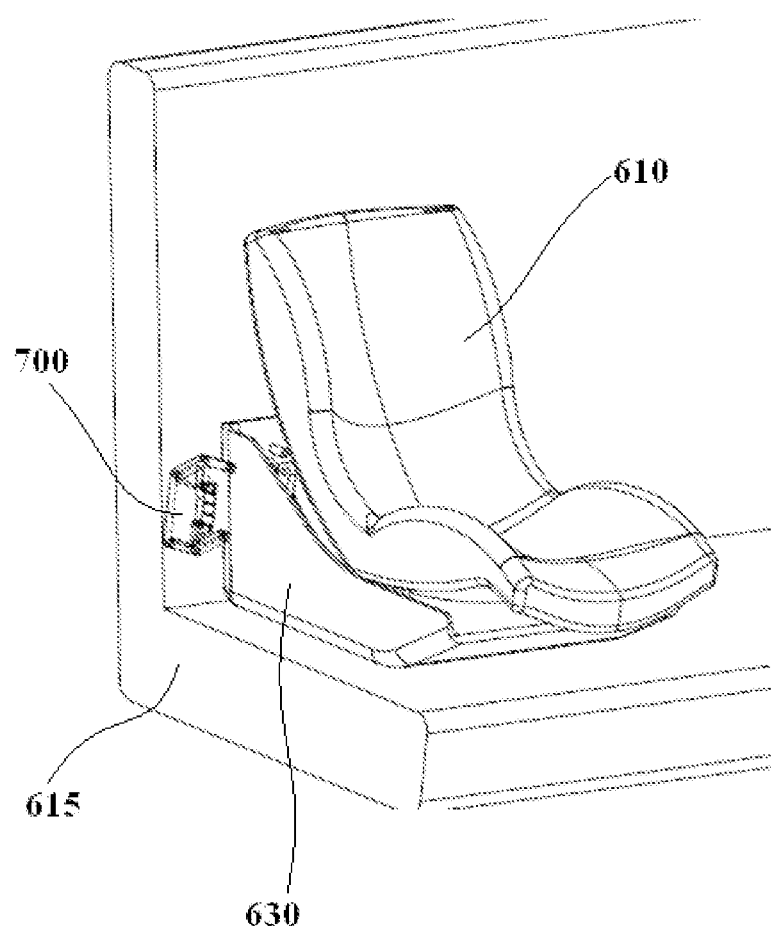
FIGS. 22 to 23 illustrate the embodiment of the invention provided with frame energy absorbing mechanism.
Figure 23:
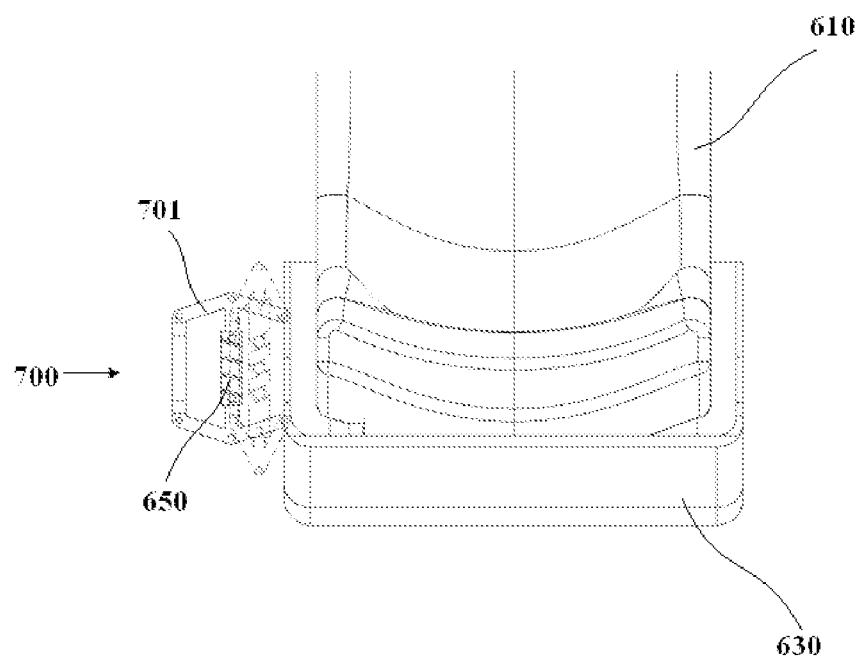

Reference is now made to FIGS. 22 and 23, presenting a forth embodiment of the invention. The seat 610 and base 615 are interconnected through a frame absorbing assembly 700 which comprises the energy absorbing element 650. As affected by a transverse impact, the baby seat 610 displaces due to collapsing the frame 701 such that the expanded element 650 absorbed at least partially the impact energy.

Figure 24:
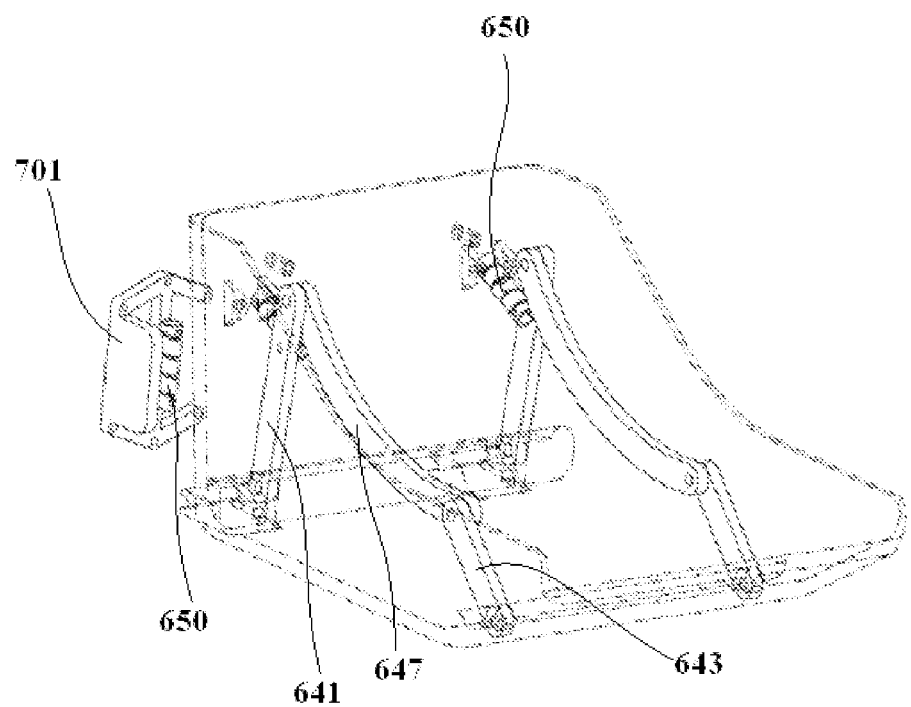
FIGS. 24 to 25 (a and b) illustrate the embodiment of the invention provided with frame and four-bar mechanisms.
Figure 25A:
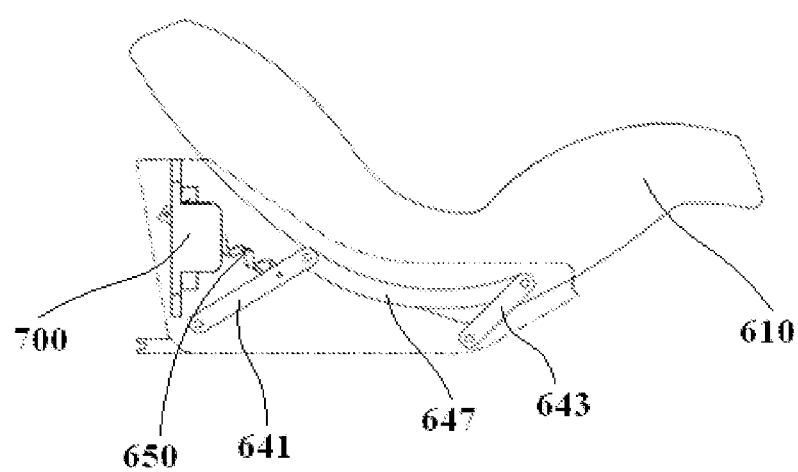
Figure 25B:
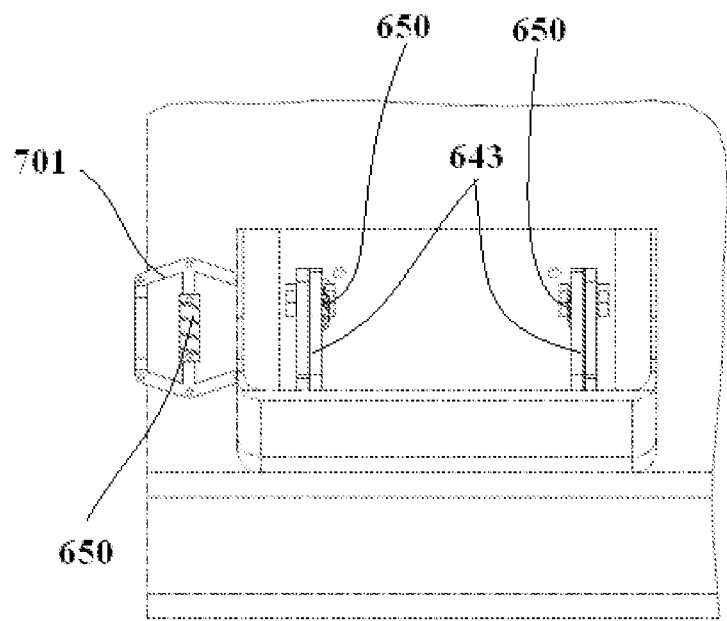

Reference is now made to FIGS. 24 and 25 (*a, b*) presenting a technical solution including a bar arrangement (641, 643 and 647) provided with the energy absorbing element 650 for protection against the longitudinal impact and the frame assemble 701 for protection against the transverse impact.

Figure 26:
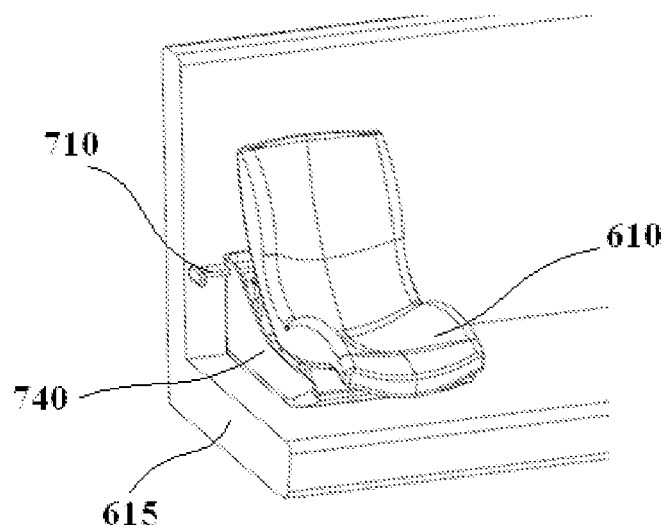
FIGS. 26 to 28 illustrate the embodiment of the invention provided with the transverse rail mechanism.
Figure 27:
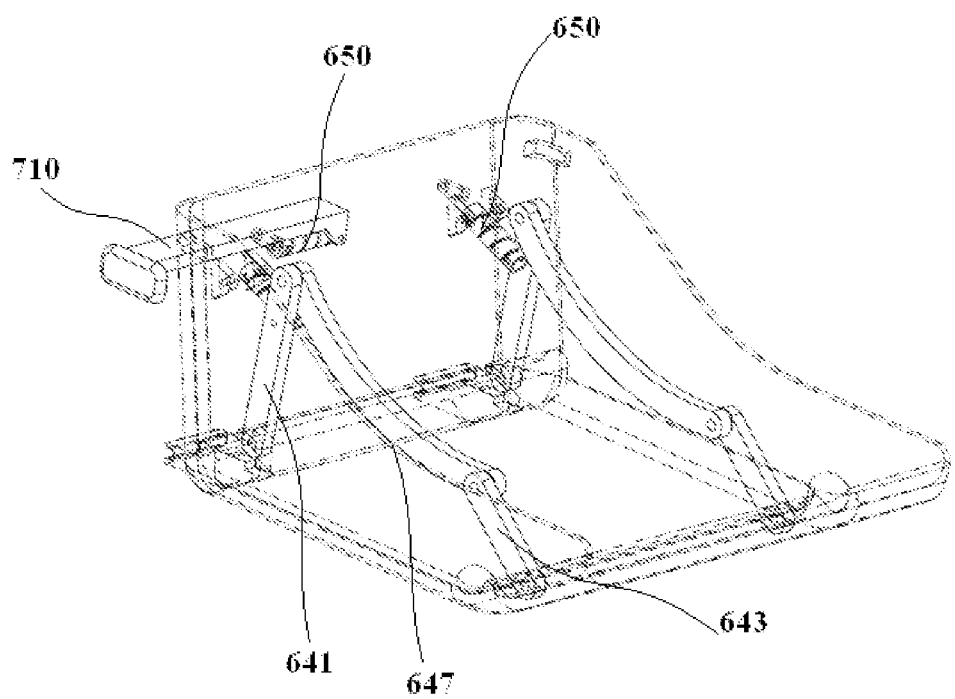
Figure 28:
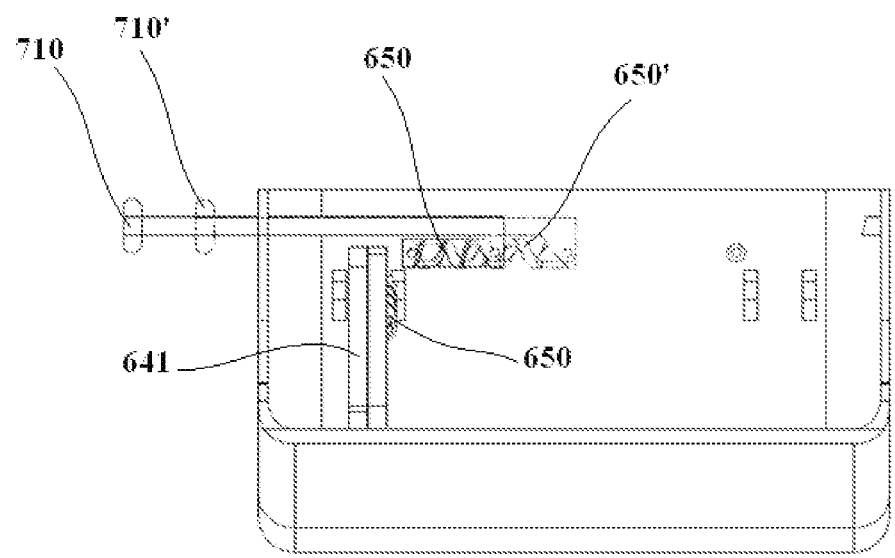
Figure 29:
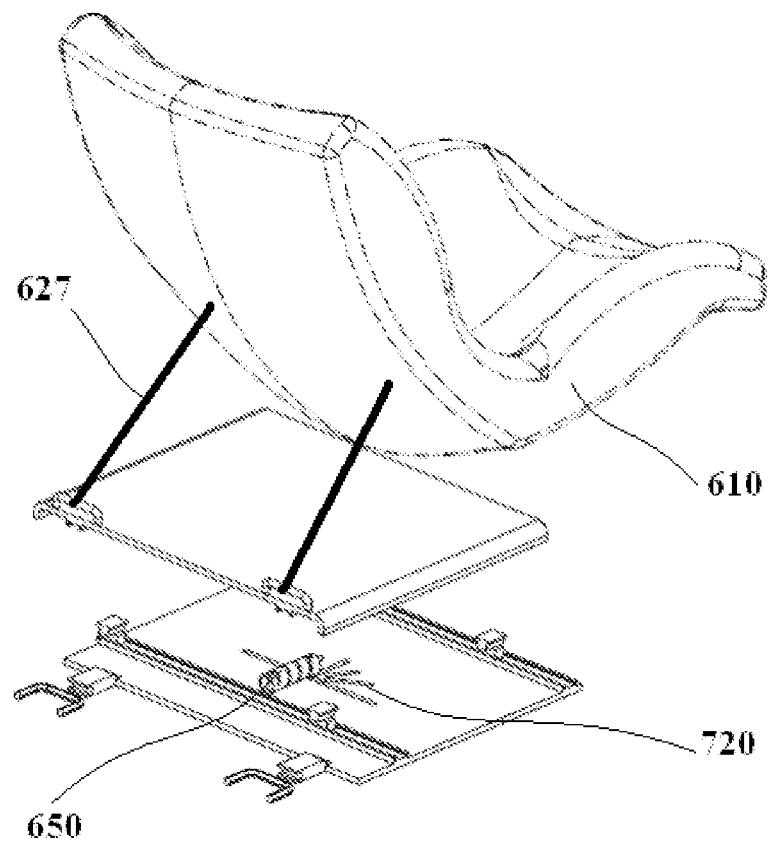
FIGS. 29 to 34 illustrate the embodiment of the invention provided with the multidirectional energy absorbing mechanism.
Figure 30:
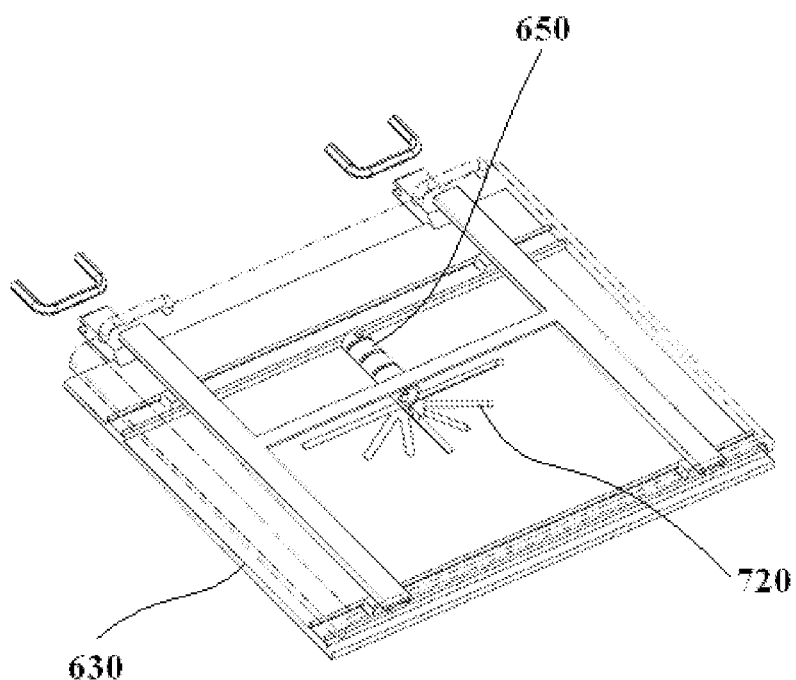

Reference is now made to FIGS. 26, 27 and 28, presenting a fifth embodiment of the invention. The aforesaid embodiment comprises energy absorbing mechanisms configured to absorb energy of longitudinal and transverse impacts. Specifically, a swingable bar arrangement including the bars 641, 643 and 647 and the energy absorbing element 650 is configured to absorb energy of the longitudinal impact. A slide 710 provided with the energy absorbing element 650 is configured to absorb energy of the transverse impact. FIG. 28 shows the slide in two positions 710 and 710' before and after the transverse impact, respectively. After the impact, the energy absorbing element 650 is in an expanded state 650'

Figure 31:
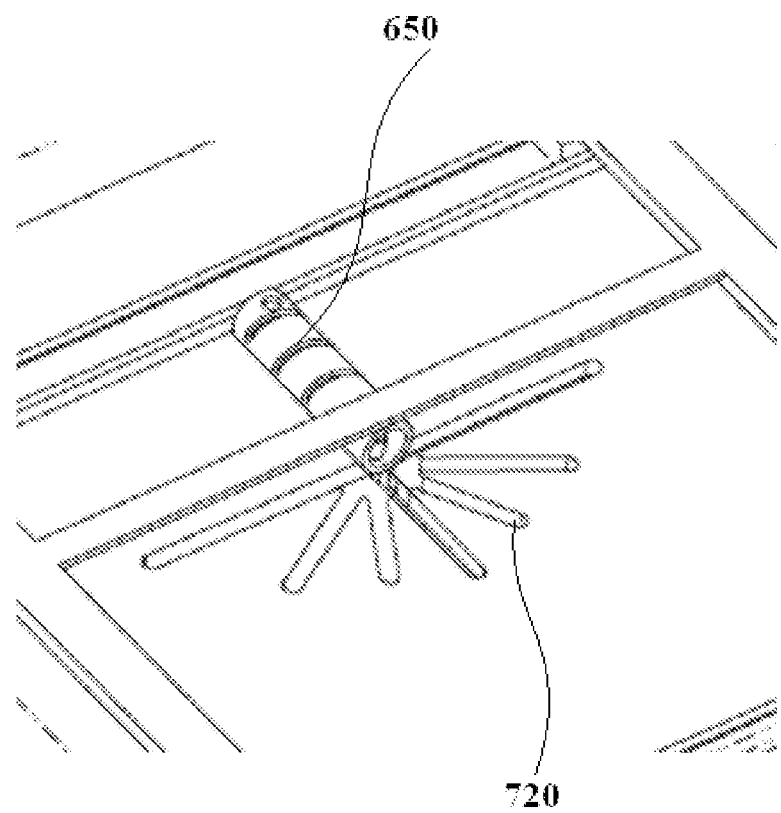
Figure 32:
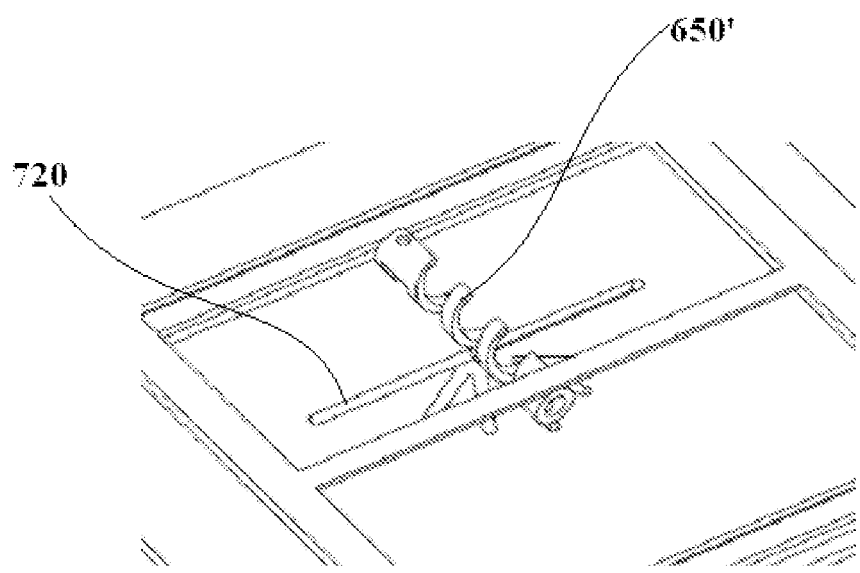

Reference is now made to FIGS. 29 to 32, presenting a sixth embodiment of the invention which comprises a multi-directional slide 720 configured for displacement of the baby seat 610 in accordance with a direction of the impact. The baby seat 610 is displaceable in a predetermined direction such that the impact energy at least partly is absorbed by the energy absorbing element 650. FIGS. 31 and 32 show the positions of energy absorbing element 650 and 650' before and after the transverse impact.

Figure 33:
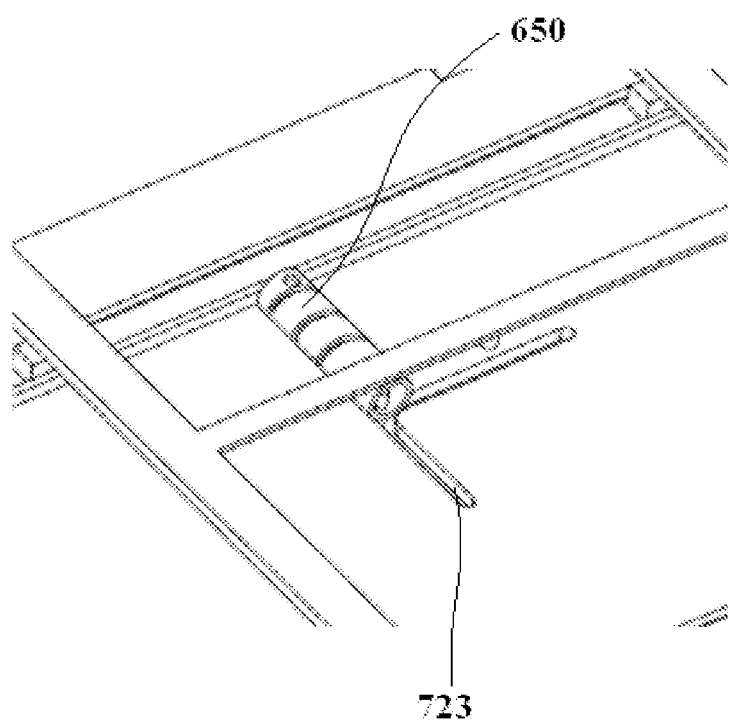
Figure 34:
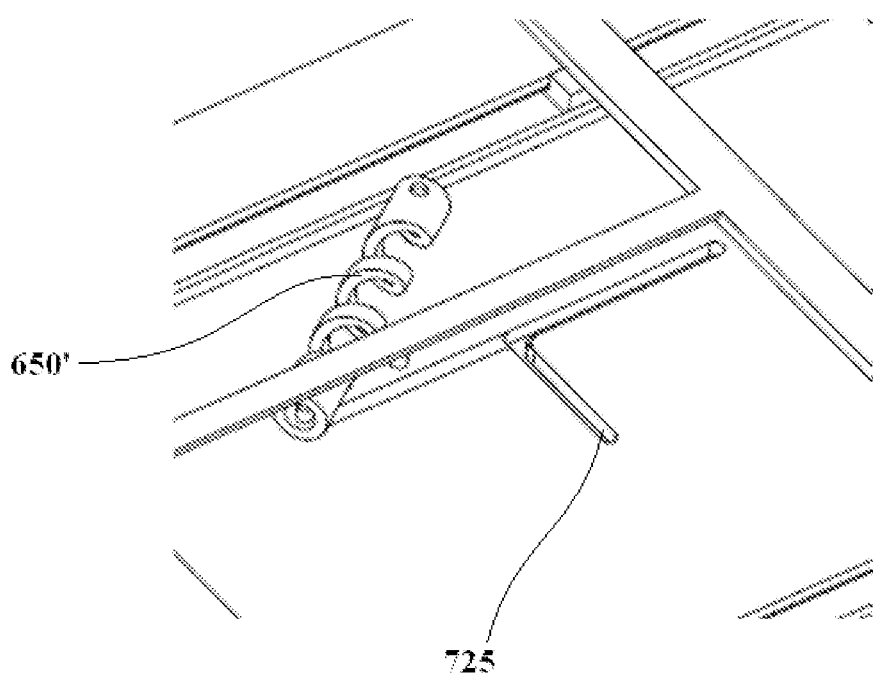
Figure 35:
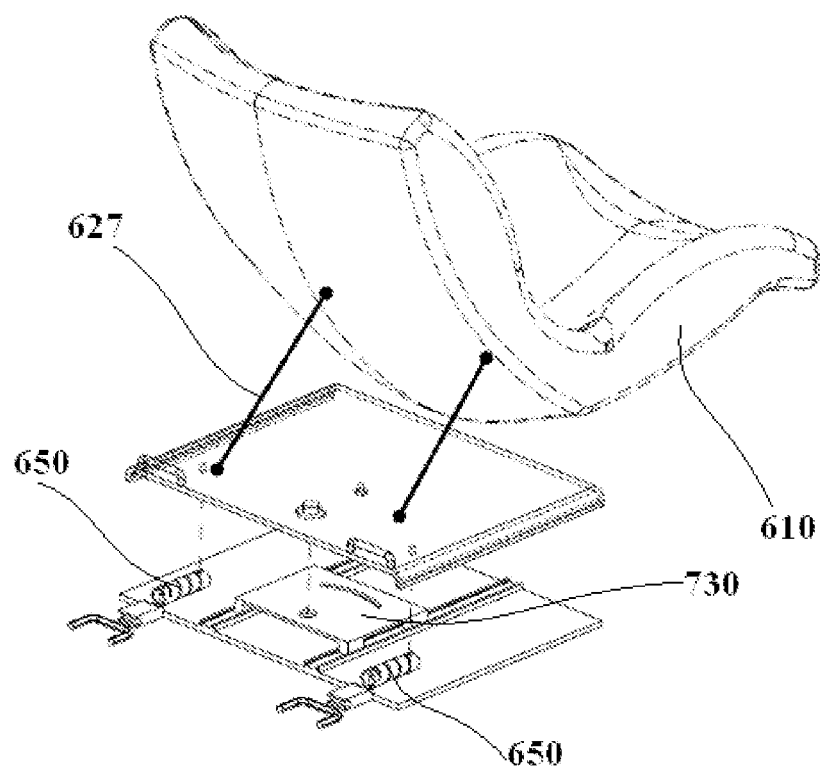
FIGS. 35 to 39 illustrate the embodiment of the invention provided with the rotating mechanism.
Figure 36:
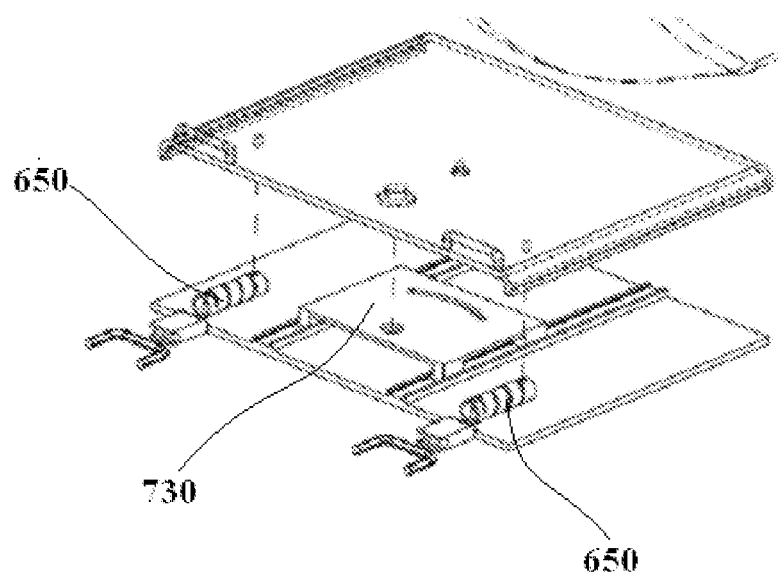

Reference is now made to FIGS. 33 and 35, presenting additional variants of the sixth embodiment. Specifically, slides 723 and 725 are configured for absorbing energy of transverse and longitudinal impacts.

Figure 37:
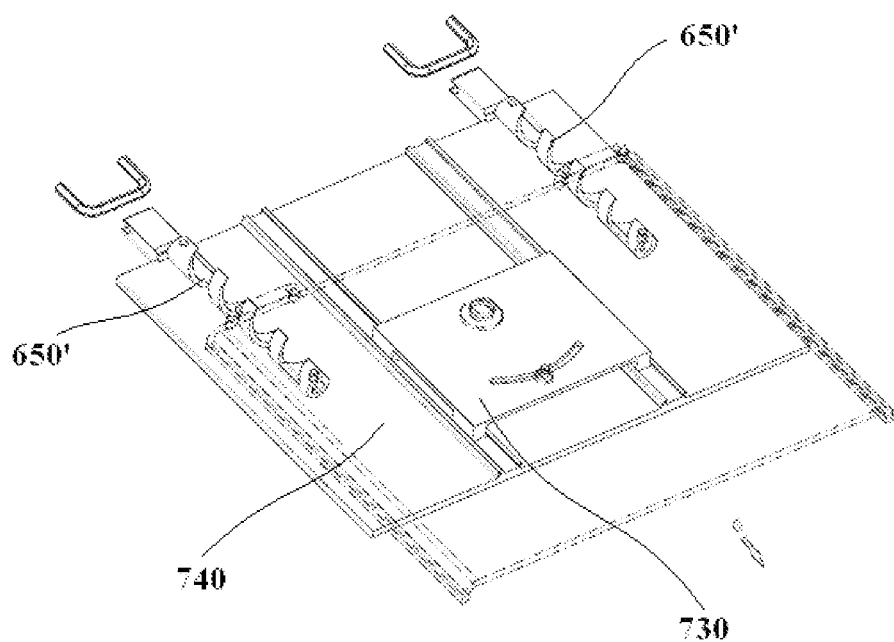
Figure 38:
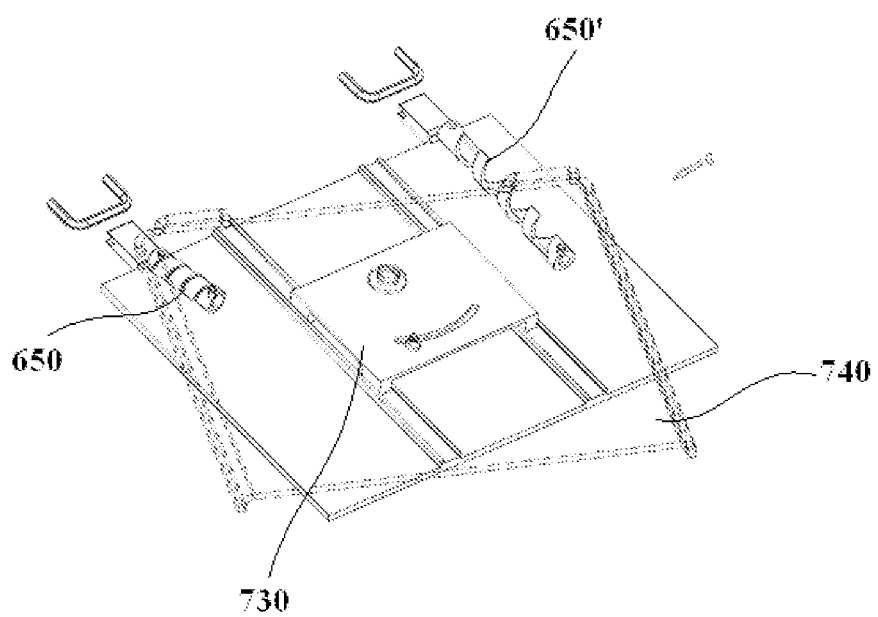
Figure 39:
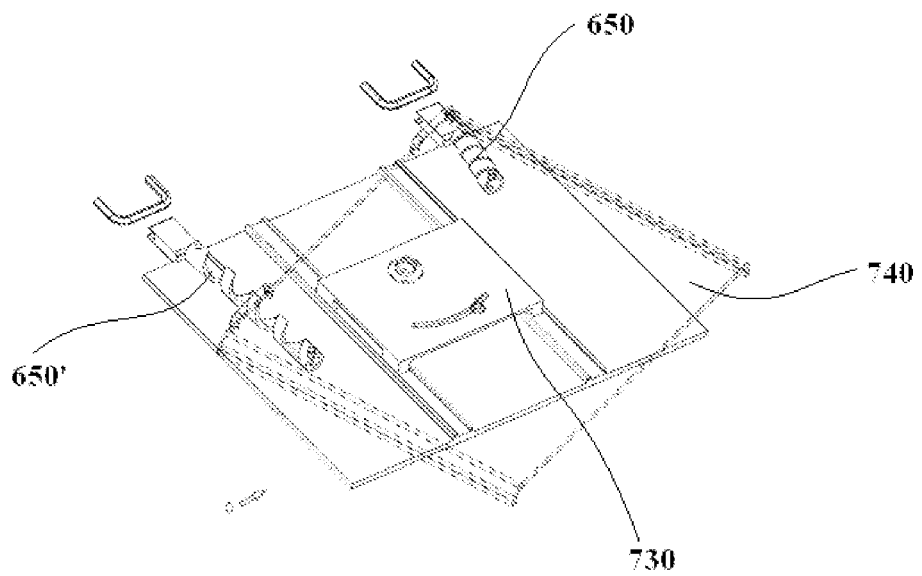

Reference is now made to FIGS. 36 to 39, presenting a seventh embodiment of the invention. The aforesaid embodiment comprises a rotatable plate 740 connected to energy absorbing elements 650. The plate 740 is mounted onto a rotating table 730. FIG. 37 shows device arrangement after a front impact. Both energy absorbing elements 650' are expanded. The plate 740 is not turned around. FIG. 38 shows device arrangement after a left impact. The left energy absorbing elements 650' is expanded while the right energy absorbing elements 650' is not expanded. The plate 740 is angularly displaced clockwise. FIG. 39 shows device arrangement after a right impact. The right energy absorbing elements 650' is expanded while the left energy absorbing elements 650' is not expanded. The plate 740 is angularly displaced counter-clockwise.

The invention claimed is:

1. An energy absorbing device adapted for carrying a passenger seat; said device comprising
   (a) a base fixedly attached to a pre-existing vehicle seat, wherein the base rests atop a seat bottom of the pre-existing vehicle seat;
   (b) a member displaceable relative to said base; and
   (c) at least one energy-absorbing arrangement interconnecting said base and said displaceable member;
   said energy-absorbing arrangement comprises a plastically deformable absorbing element in response to stresses greater than a predetermined threshold stress;
   wherein said energy-absorbing arrangement comprises a hingely interconnected four-bar sub-arrangement configured to be reshaped angularly when said device is stressed; said four-bar sub-arrangement comprises first and second bars substantially parallel to said base; said first bar is mechanically secured to said base; said second bar is mechanically secured to said displaceable member; third and fourth bars each being one piece, the third and fourth bars hingely interconnect terminals of said first and second bars; and wherein angular reshaping is controlled by said deformable element secured to said base and connected to said four-bar sub-arrangement.

2. The device according to claim 1, wherein said plastically deformable absorbing element is a helically configured ribbon having spaced-apart ribbon laps.

3. The device according to claim 2, wherein said plastically deformable absorbing element is compressible.

4. The device according to claim 2, wherein said plastically deformable absorbing element is extendable.

5. The device according to claim 1, wherein said base is connected to said vehicle by means of a connector meeting ISOFIX 13216.

6. The device according to claim 1, wherein said energy-absorbing arrangement comprises a turning arrangement configured for a smooth rotation of said displaceable member.

7. The device according to claim 1, wherein said plastically deformable absorbing element is made by means of technology selected from the group consisting of casting, injecting, eroding, molding, wire twining, machining, forming, bending, lapping, rolling, and any combination thereof.

8. The device according to claim 1, wherein said plastically deformable absorbing element is selected from the group consisting of: an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating a tube/strap/cable absorber, a tube flaring absorber, a housed coiled cable absorber, a bar-through-die absorber, a hydraulic absorber, a pneumatic absorber and combinations thereof.

9. The device according to claim 8, wherein said pre-existing vehicle seat is connected to said base by means of at least one belt.

10. The device according to claim 8, wherein said seat comprises a seat back.

* * * * *